(12) United States Patent
Tsutsumi

(10) Patent No.: US 10,388,982 B2
(45) Date of Patent: Aug. 20, 2019

(54) ELECTRODE BLOCK, LAYERED CELL, AND ASSEMBLY METHOD FOR LAYERED CELL

(71) Applicant: Exergy Power Systems, Inc., Tokyo (JP)

(72) Inventor: Kaduo Tsutsumi, Tokyo (JP)

(73) Assignee: EXERGY POWER SYSTEMS, INC., Tokyo (JP)

( * ) Notice: Subject to any disclaimer, the term of this patent is extended or adjusted under 35 U.S.C. 154(b) by 1139 days.

(21) Appl. No.: 14/402,500

(22) PCT Filed: Dec. 7, 2013

(86) PCT No.: PCT/JP2013/082893
§ 371 (c)(1),
(2) Date: Nov. 20, 2014

(87) PCT Pub. No.: WO2014/092031
PCT Pub. Date: Jun. 19, 2014

(65) Prior Publication Data
US 2015/0132637 A1      May 14, 2015

(30) Foreign Application Priority Data

Dec. 16, 2012   (WO) .................. PCT/JP2012/082586

(51) Int. Cl.
*H01M 10/00*   (2006.01)
*H01M 10/04*   (2006.01)
(Continued)

(52) U.S. Cl.
CPC ....... *H01M 10/0468* (2013.01); *H01M 2/046* (2013.01); *H01M 2/18* (2013.01);
(Continued)

(58) Field of Classification Search
CPC .. H01M 10/0468; H01M 10/281; H01M 4/75; H01M 2/18
(Continued)

(56) References Cited

U.S. PATENT DOCUMENTS 4,315,060 A      2/1982   Goebel et al.
2011/0003209 A1*  1/2011   Katayama ........... H01M 2/1606
                                                429/246
(Continued)

FOREIGN PATENT DOCUMENTS

JP      57-500854       5/1982
JP      10-106514 A     4/1998
(Continued)

OTHER PUBLICATIONS

English translation of Wakabayashi, Makoto, JP 2000048854 A, Feb. 2000, Japanese.*
(Continued)

*Primary Examiner* — Cynthia H Kelly
*Assistant Examiner* — Monique M Wills
(74) *Attorney, Agent, or Firm* — Westerman, Hattori, Daniels & Adrian, LLP

(57) ABSTRACT

An electrode block includes: an electrode group having a stacked structure with a positive electrode, a negative electrode, and a separator interposed between the positive electrode and the negative electrode; lid members disposed on two ends of the electrode group in the stacked direction; and a first holding member attached to outer surfaces of the electrode group and lid members. The first holding member is electrically connected to a first electrode which is one of the positive electrode and the negative electrode, and is not electrically connected to a second electrode which is the other one of the positive electrode and the negative electrode. Further, holes in the electrode group and lid members
(Continued)

form a through hole, and a second holding member is attached to the through hole. Thus, the electrode block is fabricated. Then the plurality of electrode blocks is housed in an outer jacket in a stacked manner, and a current collector is inserted into the through hole. Thus, a layered cell is fabricated.

19 Claims, 23 Drawing Sheets

(51) Int. Cl.
    *H01M 4/75*     (2006.01)
    *H01M 2/18*     (2006.01)
    *H01M 2/04*     (2006.01)
    *H01M 2/20*     (2006.01)
    *H01M 10/613*     (2014.01)

(52) U.S. Cl.
    CPC ............ *H01M 2/206* (2013.01); *H01M 4/75* (2013.01); *H01M 10/0413* (2013.01); *H01M 10/0422* (2013.01); *H01M 10/613* (2015.04); *Y10T 29/49114* (2015.01)

(58) Field of Classification Search
    USPC .......................................................... 429/186
    See application file for complete search history.

(56) References Cited

U.S. PATENT DOCUMENTS

2011/0097622 A1    4/2011    Kim et al.
2012/0270091 A1    10/2012    Kuhn et al.
2018/0069222 A1*    3/2018    Shaffer, II ............... H01M 2/24

FOREIGN PATENT DOCUMENTS

| | | | | |
|---|---|---|---|---|
| JP | 2000-48854 | | 2/2000 | |
| JP | 2000-48854 A | | 2/2000 | |
| JP | 0200048854 A | * | 2/2000 | ............. H01M 2/00 |
| JP | 2000048854 A | * | 2/2000 | |
| JP | 2002-198044 | | 7/2002 | |
| JP | 2008-117568 A | | 5/2008 | |
| KR | 10-2007-0027354 B1 | | 3/2007 | |
| KR | 10-2010-0000885 B1 | | 1/2010 | |
| WO | 2012/173091 | | 12/2012 | |
| WO | 2012/173091 A1 | | 12/2012 | |
| WO | 2013/042640 | | 3/2013 | |
| WO | 2013/094383 | | 6/2013 | |

OTHER PUBLICATIONS

International Search Report (ISR) dated Jan. 14, 2014 in International (PCT) Application No. PCT/JP2013/082893.

Office Action dated Sep. 7, 2018, issued in counterpart Indian application No. 2512/KOLNP/2014, with English translation. (6 pages).

Office Action dated Feb. 22, 2016, issued in counterpart Korean Application No. 10-2014-7033831. (9 pages).

* cited by examiner

ELECTRODE BLOCK, LAYERED CELL, AND ASSEMBLY METHOD FOR LAYERED CELL

TECHNICAL FIELD

The invention relates to an electrode block capable of improving cooling performance and preventing a short circuit and a contact failure; a layered cell; and an assembly method for the layered cell.

BACKGROUND ART

Electrode structures of a secondary battery are mainly classified into two types, i.e., a spiral-wound type and a layered type. In a battery having the spiral-wound type electrode structure (a spiral-wound battery; refer to Patent Literature 1 for example), a positive electrode and a negative electrode which are spirally wound with a separator interposed therebetween are housed in a battery case. In a battery having the layered type electrode structure (a layered cell; refer to Patent Literature 2 for example), an electrode group including a positive electrode and a negative electrode which are alternately stacked with a separator interposed therebetween is housed in a battery case.

CITATION LIST

Patent Literature

Patent Literature 1: JP 2002-198044 A
Patent Literature 2: JP 2000-048854 A

SUMMARY OF INVENTION

Technical Problem

With regard to the spiral-wound battery disclosed in Patent Literature 1, the separator with low thermal conductivity is provided in a multilayered manner between the surface and center of the battery. As the result, even when a surface temperature of the battery case is close to an ambient temperature, a temperature of a portion around the center of the spiral-wound battery becomes considerably high. The high temperature inside the battery may impair the performance of the battery.

The cylindrical layered cell disclosed in Patent Literature 2 has a structure to collect electricity in such a manner that the stacked electrodes are in contact with terminals individually. Therefore, an initial failure may occur because of a short circuit between the positive electrode and the negative electrode in the course of assembling the cylindrical layered cell. Moreover, a contact failure may occur because of the separator interposed between the electrode and the terminal. Further, the electrode repeatedly contracts and expands by the repetition of charge and discharge. As the result, a contact failure between the electrode and the terminal may occur because of the deformation and displacement of the electrode, which may result in a secular failure.

In order to achieve a large battery capacity by assembling small batteries to form a battery pack, much time and effort are required for connecting among the batteries. Further, if one of the batteries in the battery pack is failed, much time and effort are required for exchanging the failed battery with a normal battery.

The invention has been devised to solve the foregoing problems, and objects thereof are to restrain a temperature rise inside a battery, to prevent a contact failure and a short circuit between electrodes, and to provide a battery which can be easily assembled.

Solution to Problem

An electrode block according to the invention includes: an electrode group having a stacked structure with a positive electrode, a negative electrode, and a separator interposed between the positive electrode and the negative electrode; lid members disposed on two ends of the electrode group in the stacked direction; and a first holding member attached to outer surfaces of the electrode group and lid members. Herein, the first holding member is electrically connected to a first electrode which is one of the positive electrode and the negative electrode, and is not electrically connected to a second electrode which is the other one of the positive electrode and the negative electrode.

Herein, the "outer surfaces" refer to the surfaces, which face the outside, of the electrode group and lid members. According to this configuration, the first holding member is attached to the outsides of the electrode group and lid members to hold the electrode group and the lid members. That is, the first holding member serves to achieve an integral structure with the electrode group and the lid members. The integral structure facilitates the handling of the electrode group. The first holding member may be provided to cover the electrode group and the lid members except circumferential edges of holes in the lid members. Alternatively, the first holding member may be attached to at least side surfaces of the electrode group and lid members because of the following reason. That is, the first holding member can integrally hold the electrode group and the lid members even when the first holding member is not attached to the surfaces of the lid members.

The first holding member may be formed of one metal plate or a plurality of short metal strips. Alternatively, the first holding member may be formed of a metal foil.

The first holding member is connected to the first electrode to function as a current collector terminal for the first electrode. The first electrode is connected to the first holding member with thermally and electrically low resistance. The first holding member is advantageously acted on the cooling and current collection for the first electrode.

Heat generated from the first electrode is transferred to the first holding member. Heat generated from the second electrode is transferred to the first electrode via one separator. The heat generated from the electrode is transferred to the first holding member with low thermal resistance.

The electrode block is configured to cool a surface of the first holding member, thereby easily restraining a temperature rise thereinside.

The electrode block is not provided with an outer jacket for housing the electrode block, and a current collector for the second electrode. As will be described later, actually, a battery includes an outer jacket, and a current collector for the second electrode, in addition to the electrode block. The electrode block is one of constituents of a battery.

Assembling such an electrode block into a module improves battery productivity. As compared with a battery having a configuration in that electrodes are independently housed in a battery case, the electrode block can prevent the positive electrode and the negative electrode from being damaged or displaced, and therefore can prevent a contact failure and a short circuit. Further, adjusting the number of electrode blocks to be housed in a battery case can easily increase and decrease a battery capacity. In other words, increasing the number of electrode blocks can easily increase the battery capacity because the electrode blocks are connected in parallel.

In the electrode block, preferably, each of the first electrode, the second electrode, and the separator has a hole formed at a center thereof, an outer edge of the second electrode is covered with the separator, a circumferential edge of the hole in the first electrode is covered with the separator, an outer edge of the separator is covered with the first electrode, and a circumferential edge of the hole in the separator is covered with the second electrode. Thus, the separator certainly separates the first electrode and the second electrode from each other at the outer edge of the second electrode and the circumferential edge of the hole in the first electrode. Accordingly, even when the electrodes are deformed, the electrodes do not come into contact with each other at the outer edge and the circumferential edge of the hole. Moreover, the separator is not interposed between the electrode and the terminal, and therefore causes no contact failure. An outer diameter of the separator is larger than that of the second electrode, and a hole diameter of the separator is smaller than that of the first electrode. An outer diameter of the first electrode is larger than that of the separator, and the hole diameter of the separator is larger than that of the second electrode.

In the electrode block, preferably, the first holding member has a plurality of protrusions formed on at least one side thereof. According to this configuration, the plurality of protrusions is formed on at least one of a surface coming into contact with the first electrode and an opposite surface to the surface, in the first holding member. The plurality of protrusions bites into the first electrode to firmly hold the first electrode, to maintain the shape of the first electrode, and to ensure the contact of the first electrode with the first holding member. Preferably, the plurality of protrusions is formed at least on the surface coming into contact with at least the first electrode. Thus, the plurality of protrusions prevents a contact failure between the first electrode and the first holding member even when the volume of the first electrode changes. Moreover, the electrode block may further include a metal plate interposed between the first holding member and the first electrode, the metal plate having a plurality of protrusions formed on at least one side thereof.

In the electrode block, preferably, the first electrode is enclosed with a first separator having a bag shape in a state that an outer edge of the first electrode is exposed from the first separator. Also in the electrode block, the second electrode may be enclosed with a second separator having a bag shape in a state that an inner edge of the hole in the second electrode is exposed from the second separator.

The first separator has the bag shape formed in such a manner that, for example, an inner edge thereof is bonded by welding. The first electrode is enclosed with the bag-shaped separator in the state that the outer edge is exposed from the bag-shaped separator. The first separator can be fabricated in such a manner that, for example, the first electrode is sandwiched between sheet-shaped separators and inner edges of the separators are welded. On the other hand, the second separator has the bag shape formed in such a manner that, for example, an outer edge thereof is bonded by welding. The second electrode is enclosed with the bag-shaped separator in the state that the inner edge thereof, i.e., the circumferential edge of the hole is exposed from the bag-shaped separator. The second separator can be fabricated in such a manner that, for example, the second electrode is sandwiched between sheet-shaped separators and outer edges of the separators are welded.

According to this configuration, the bag-shaped separators capture therein dust or foreign matters derived from the first and second electrodes in the course of assembling the electrode block and in the course of transporting the electrode block, which prevents an internal short circuit.

In the electrode block, preferably, the first holding member has a side surface portion coming into contact with a side surface of the electrode block, and bent portions bent from the side surface portion toward centers of the lid members. According to this configuration, the first holding member has the bent portions formed at the two ends in the stacked direction, and the side surface portion located between the bent portions.

In the electrode block, the first holding member is fixed to outer side surfaces of the lid members. According to this configuration, the end of the first holding member in the stacked direction and the outer side surface of the lid member are fixed together, so that the electrode block is configured to have an integral structure. The first holding member having no bent portion allows reduction in axial dimension of the electrode block.

In the electrode block, preferably, each of the lid members has a hole formed at a center thereof, and the holes in the positive electrode, negative electrode, separator, and lid members form a through hole in a stacked state of the electrode group and lid members. The electrode block may further include a second holding member attached to an inner surface of the through hole. Preferably, the second holding member is electrically connected to the second electrode, and is not electrically connected to the first electrode. According to this configuration, both the second holding member and the first holding member hold the electrode group.

In the electrode block, preferably, the second holding member has a plurality of protrusions formed on at least one side thereof. According to this configuration, the plurality of protrusions may be formed on at least one of a surface coming into contact with the second electrode and an opposite surface to the surface, in the second holding member. The plurality of protrusions bites into the second electrode to firmly hold the second electrode and to ensure the contact. Preferably, the plurality of protrusions is formed on at least the surface coming into contact with the second electrode. Thus, the plurality of protrusions prevents a contact failure between the second electrode and the second holding member even when the volume of the second electrode changes. The electrode block may further include a metal plate interposed between the second holding member and the second electrode, the metal plate having a plurality of protrusions formed on at least one side thereof.

A layered cell according to the invention includes: the electrode block; a tubular outer jacket for housing the electrode block; and a current collector passing through the through hole in the electrode block. Preferably, the first electrode is electrically connected to the outer jacket, and the second electrode is electrically connected to the current collector.

According to this configuration, the outer jacket functions as a current collector terminal for the first electrode. The first holding member of the electrode block directly comes into contact with an inner surface of the outer jacket, or comes into contact with the inner surface of the outer jacket via an electrically conductive member. Thus, the first electrode is connected to the outer jacket with thermally and electrically low resistance via the first holding member, so that the outer jacket is effectively acted on the cooling and current collection for the first electrode.

Moreover, the inner edge of the hole in the second electrode, through which the current collector passes, entirely or partly comes into contact with the current collector in a direct manner or is entirely or partly connected to the current collector via an electrically conductive member such as a metal plate. Heat generated from the second electrode is transferred to the first electrode via the separator, and then is transferred to the outer jacket with thermally low resistance.

As described above, the layered cell according to the invention requires no heatsink or no pipe for supplying a coolant thereinto, in order to restrain a temperature rise thereinside. Therefore, the layered cell according to the invention can be manufactured with a compact structure. Moreover, the layered cell according to the invention easily restrains the temperature rise thereinside by cooling the surface of the outer jacket.

The number of electrode blocks to be housed in the outer jacket is not particularly limited. Adjusting the number of electrode blocks can easily change a battery capacity. The electrode blocks are structurally connected in series in such a manner that the outer jacket houses therein the electrode blocks. In the adjacent electrode blocks, the first electrodes are electrically connected to each other via the outer jacket, and the second electrodes are electrically connected to each other via the current collector. Thus, the electrode blocks are electrically connected in parallel.

Heretofore, batteries have been electrically connected in parallel as follows. That is, in the adjacent batteries, positive terminals are connected to each other by means of wiring and negative terminals are also connected to each other by means of wiring. In other words, the wiring is indispensable for the parallel connection among the batteries, which results in complicated wiring work and restriction on an installation space.

In the layered cell according to the invention, on the other hand, the electrode blocks are stacked in the outer jacket, so that positive terminals can be electrically connected to each other and negative terminals can be electrically connected to each other in the adjacent electrode blocks. In other words, the layered cell establishes a structurally simple serial connection, and also establishes an electrically simple parallel connection. This configuration can easily increase the capacity of the layered cell.

In the layered cell, preferably, the current collector includes an electrically conductive core rod, and a structural member for covering an outer periphery of the core rod. The core rod is made of a material with high electrical conductivity, and the structural member is made of a material with alkali-resistance. Thus, the current collector can possess high electrical conductivity and alkali-resistance.

Preferably, the layered cell further includes a sealing cap for closing an open end of the outer jacket. Herein, the sealing cap has two annular grooves formed on an outer periphery thereof. The sealing cap includes an O-ring attached to each annular groove, and a sealing member provided between the annular grooves. According to this configuration, the O-ring and the sealing member, each of which is provided on the sealing cap for closing the axial open end of the outer jacket, prevent an electrolyte from being leaked from the layered cell.

Preferably, the layered cell further includes a plurality of radiator plates attached to an outer circumferential surface of the outer jacket along an axial direction of the outer jacket. This configuration improves the cooling performance of the layered cell.

Preferably, the layered cell further includes a through bolt passing through the radiator plates. According to this configuration, the radiator plate, the outer jacket, and the first electrode are electrically connected to one another via the through bolt. The through bolt functions as a terminal of the first electrode.

A battery pack according to the invention includes: the plurality of layered cells; a first connecting member for connecting between the through bolts of the adjacent layered cells; and a second connecting member for connecting between the current collectors of the adjacent layered cells. Herein, the first connecting member and the second connecting member electrically connect among the layered cells. According to this configuration, the connecting member establishes an electrical parallel connection among the layered cells.

A battery pack according to the invention includes: the plurality of layered cells; and a third connecting member for connecting between the through bolt of one of the adjacent layered cells and the current collector of the other layered cell. Herein, the third connecting member electrically connects among the layered cells. According to this configuration, the connecting member establishes an electrical serial connection among the layered cells.

Advantageous Effect of Invention

According to the invention, as described above, it is possible to restrain a temperature rise inside a battery, to prevent a short circuit between electrodes and a contact failure, and to provide a battery which can be easily assembled.

DESCRIPTION OF EMBODIMENT

With reference to the drawings, hereinafter, description will be given of embodiments of the invention; however, the invention is not limited to these embodiments. Moreover, numbers, dimensions, materials, and the like to be described in the following embodiments are not intended to limit the scope of the invention.

Prior to the description of the respective embodiments of the invention, first, description will be given of a secondary battery to which the invention is applicable. The secondary battery is not limited to types to be described below, and examples thereof may include a nickel-zinc battery, a manganese dioxide battery, a zinc-manganese battery, and a nickel-cadmium battery.

1. TYPES OF SECONDARY BATTERY

[1-1. Nickel-Metal Hydride Battery]

A negative electrode to be used herein was obtained as follows. That is, a paste obtained by adding a solvent to a hydrogen storage alloy, an electrically conductive filler, and a binder was applied onto a substrate so as to be formed into a sheet shape, and then was cured. Likewise, a positive electrode to be used herein was obtained as follows. That is, a paste obtained by adding a solvent to nickel oxyhydroxide, an electrically conductive filler, and a binder was applied onto a substrate so as to be formed into a sheet shape, and then was cured.

The electrically conductive filler to be used herein was a carbon particle. The binder to be used herein was a thermoplastic resin which dissolves in a water-soluble solvent. The substrate to be used herein was a foamable nickel sheet. A separator to be used herein was a polypropylene fiber. An electrolyte to be used herein was a KOH aqueous solution.

[1-2. Lithium-Ion Battery]

With regard to a negative electrode, first, a slurry mixture is prepared by mixing lithium titanate, carboxymethylcellulose (CMC), and Ketjen Black (KB). Next, this mixture is applied onto a stainless steel foil, is temporarily dried, and then is subjected to heat treatment. Thus, the negative electrode can be obtained. With regard to a positive electrode, first, a slurry mixture is prepared by mixing lithium iron phosphate, CMC, active carbon, and KB. Next, this mixture is applied onto a stainless steel foil, is temporarily dried, and then is subjected to heat treatment. Thus, the positive electrode can be obtained.

A separator to be used herein may be a microporous film made of polypropylene. An electrolyte to be used herein may be 1 mol/L $LiPF_6$/EC:DEC. An electrically conductive agent to be used herein may be KB. A binder to be used herein may be CMC. Each of the positive electrode, the negative electrode, and a current collector may be made of stainless steel.

2. EMBODIMENTS OF ELECTRODE BLOCK

Hereinafter, a positive electrode is occasionally referred to as a first electrode, and a negative electrode is occasionally referred to as a second electrode for convenience of the description, but not limited thereto.

2-1. First Embodiment

Figure 1A:
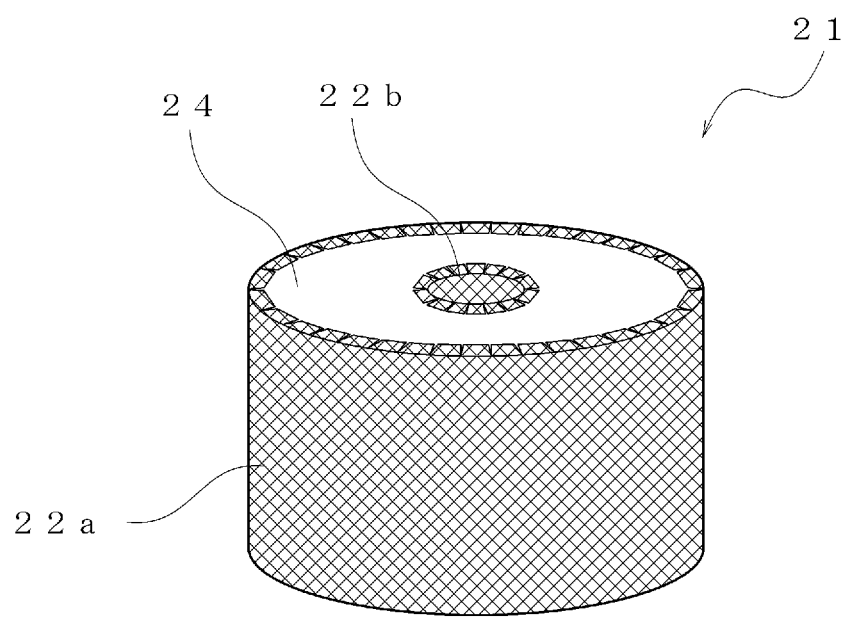
FIG. 1A is a perspective view of a schematic configuration of an electrode block according to a first embodiment.
Figure 1B:
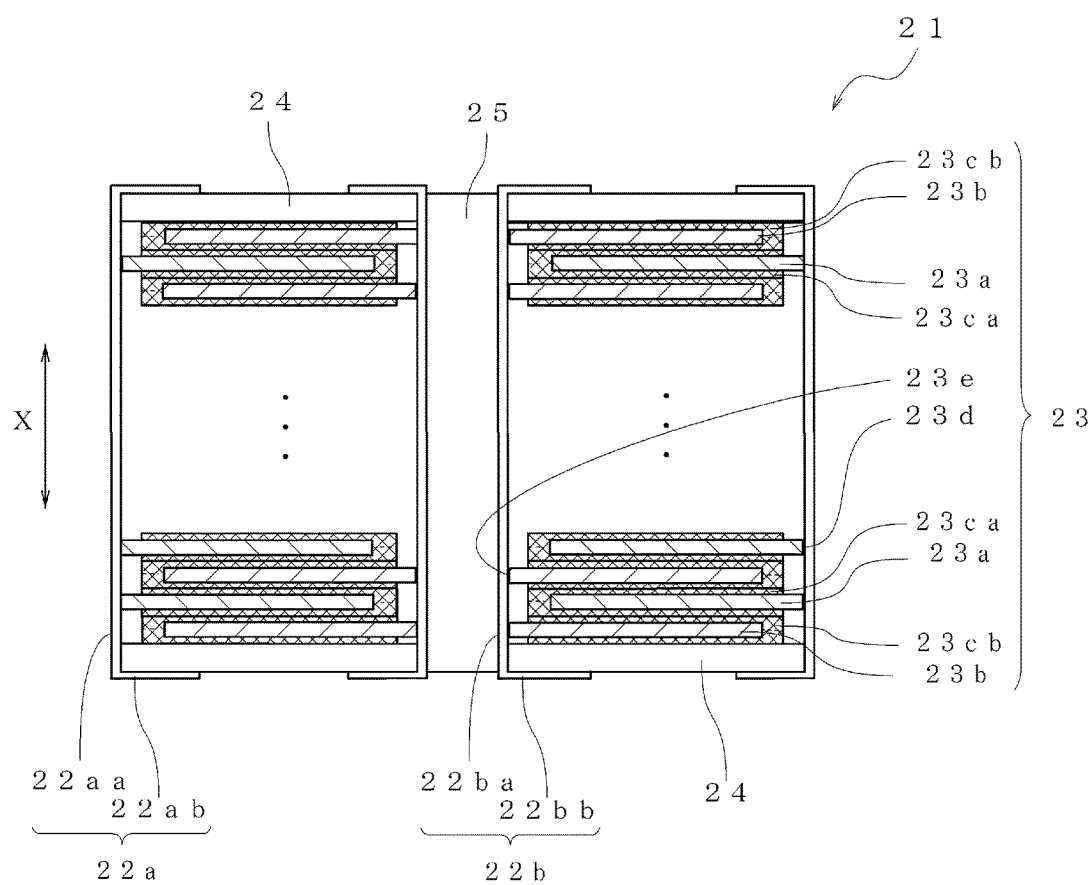
FIG. 1B is an axial sectional view of the electrode block according to the first embodiment.

FIG. 1A is a perspective view schematically illustrating an electrode block according to a first embodiment of the invention. FIG. 1B is an axial sectional view schematically illustrating the electrode block. As illustrated in FIG. 1B, the electrode block 21 includes an electrode group 23, lid members 24, a first holding member 22a, and a second holding member 22b.

The electrode group 23 has a configuration in that a positive electrode 23a and a negative electrode 23b are stacked with a bag-shaped separator 23c interposed therebetween. The electrode group 23 is sandwiched between the lid members 24 at two ends thereof in the stacked direction (direction X in FIG. 1B). The positive electrode 23a, the negative electrode 23b, the bag-shaped separator 23c, and the lid members 24 each have a disc shape with a hole formed at a center thereof, and are stacked in a concentric manner. The lid members 24 are made of polypropylene, but may be made of any insulative resin. Each of the positive electrode 23a and the negative electrode 23b is enclosed with the bag-shaped separator.

Figure 2A:
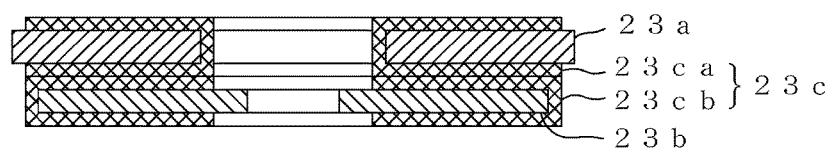
FIG. 2A is a sectional view of electrodes each enclosed with a bag-shaped separator.

FIG. 2A is a sectional view illustrating the electrodes each enclosed with the bag-shaped separator. For simplification, FIG. 2A illustrates one positive electrode 23a and one negative electrode 23b. The positive electrode 23a is enclosed with the bag-shaped separator 23ca except an outer edge thereof. On the other hand, the negative electrode 23b is enclosed with the bag-shaped separator 23cb except a circumferential edge of the center hole therein.

Figure 2B:
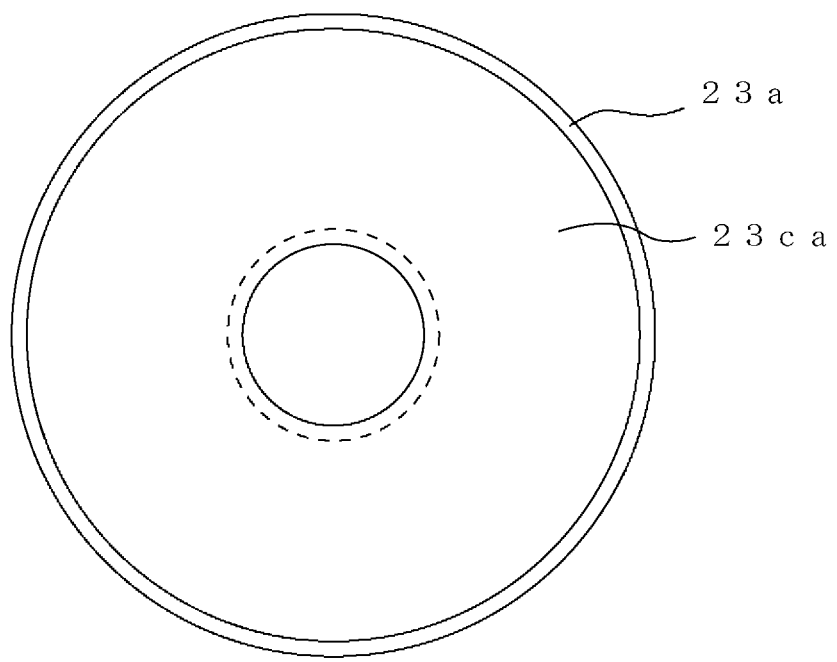
FIG. 2B is a plan view of the positive electrode enclosed with the bag-shaped separator.
Figure 2C:
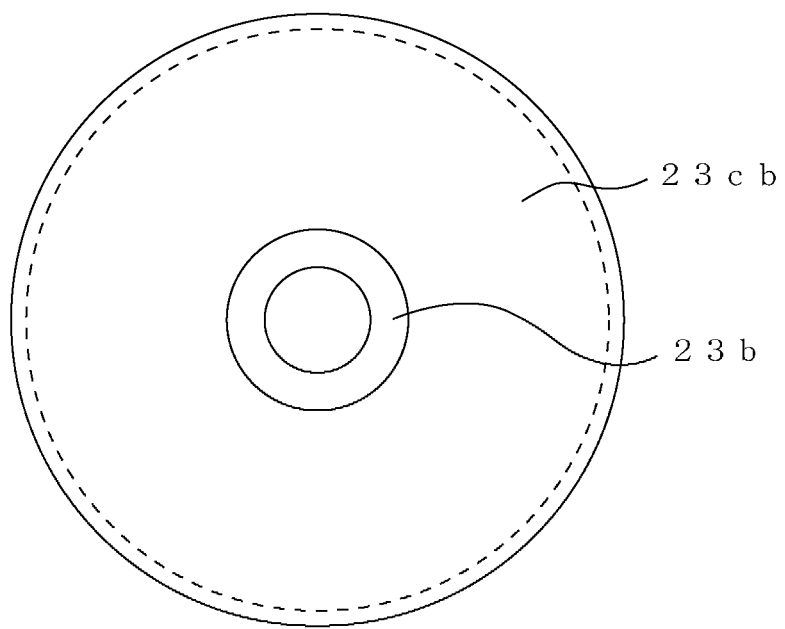
FIG. 2C is a plan view of the negative electrode enclosed with the bag-shaped separator.

FIG. 2B is a plan view illustrating the positive electrode 23a enclosed with the bag-shaped separator. FIG. 2C is a plan view illustrating the negative electrode 23b enclosed with the bag-shaped separator.

The positive electrode 23a is sandwiched between two separators each having an outer diameter smaller than that of the positive electrode 23a and a center hole diameter smaller than that of the positive electrode 23a. Herein, a portion where the separators overlap each other (a circumferential edge of the center hole) is bonded by heat sealing. Thus, the positive electrode 23a is enclosed with the bag-shaped separator 23ca. On the other hand, the negative electrode 23b is sandwiched between two separators each having an outer diameter larger than that of the negative electrode 23b and a center hole diameter larger than that of the negative electrode 23b. Herein, a portion where the separators overlap each other (an outer circumferential edge) is bonded by heat sealing. Thus, the negative electrode 23b is enclosed with the bag-shaped separator 23cb.

The bag-shaped separator captures therein dust or foreign matters derived from the electrode in the course of assembling the electrode block and in the course of transporting the electrode block. The use of the bag-shaped separator prevents the entry of dust or foreign matters derived from the electrode into between the electrodes and between the electrode and a current collector terminal, which leads to prevention of an internal short circuit. The use of the bag-shaped separator also prevents a contact failure due to the separators which are displaced and consequently are interposed between the positive and negative electrodes 23a and 23b and the holding members 22.

The positive electrode 23a enclosed with the bag-shaped separator 23ca and the negative electrode 23b enclosed with the bag-shaped separator 23cb are sequentially stacked such that the respective holes communicate with each other, thereby forming the electrode group 23. Then the lid members 24 are disposed on the axial two ends of the electrode group 23 (direction X in FIG. 1B). The center holes in the positive electrode 23a, negative electrode 23b, separator 23ca, separator 23cb and lid members 24 communicate with one another to form a through hole 25.

Figure 3A:
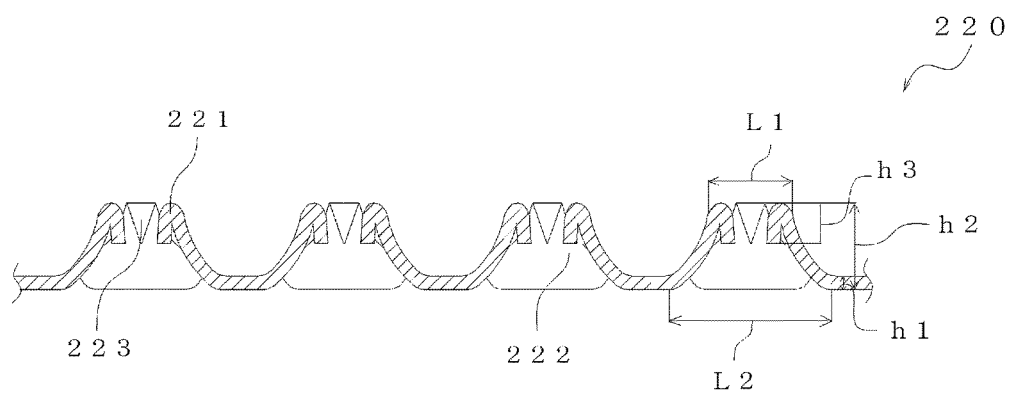
FIG. 3A is a sectional view of a metal plate of the electrode block.
Figure 3B:
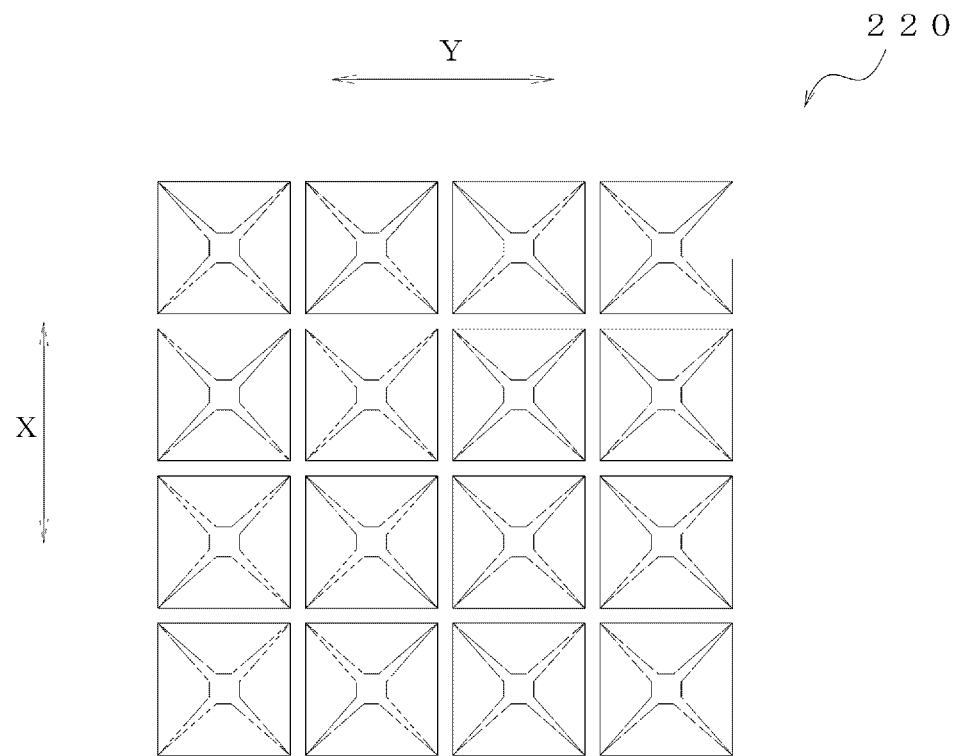
FIG. 3B is a plan view of the metal plate of the electrode block.

The first holding member 22a maintains the shapes of the electrode group 23 and lid members 24 from the outsides of the electrode group 23 and lid members 24. The second holding member 22b maintains the shapes of the electrode group 23 and lid members 24 from the inside of the through hole 25. FIG. 3A and FIG. 3B are a sectional view and a plan view each illustrating a metal plate 220 that forms the holding member 22. As illustrated in FIG. 3A, the metal plate 220 has a large number of protrusions 221 formed on a surface thereof so as to protrude from the surface. The metal plate 220 is obtained as follows. That is, protrusions and perforations are formed on a metal plate by an embossing roll, and a tip end of each protrusion is folded back to form a folded portion.

The metal plate 220 has a thickness which is not particularly limited herein, but is preferably smaller than that of the positive electrode 23a or negative electrode 23b. The thickness of the metal plate 220 is preferably 10 to 100 µm although depending on the thickness of the positive electrode 23a or negative electrode 23b. The thickness of the metal plate 220 is more preferably 20 to 50 µm. The larger thickness of the metal plate 220 causes increase in dimensions of a battery. On the other hand, the smaller thickness of the metal plate 220 causes degradation in strength of the metal plate.

Each protrusion 221 is perforated, so that an opening 222 is formed in a vertex of the protrusion 221. The protrusion 221 is folded back in a direction opposite to the extending direction of the protrusion 221, so that a folded portion 223 is formed in the opening 222. The metal plate 220 is formed of a nickel foil having a thickness (h1) of 25 µm. The protrusion 221 has a quadrangular pyramid shape consisting of a structural upper portion L1 and a structural lower portion L2, and is formed on the nickel foil. The structural lower portion L2 has longitudinal and lateral lengths (directions X, Y in FIG. 3B) each of which is 1 mm. The structural upper portion L1 has longitudinal and lateral lengths each of which is 0.5 mm. The metal plate 220 including the protrusion 221 has a thickness (h2) of 0.5 mm. The folded portion 223 has a length (h3) of 0.15 mm.

The first holding member 22a is disposed on outer surfaces 23d of the electrode group 23 and lid members 24. Herein, the outer surfaces 23d correspond to a side surface of the electrode group 23 and bare surfaces of the lid members 24. More specifically, the first holding member 22a is attached to the side surface of the electrode group 23 and circumferential edges including the outer side surfaces of the lid members 24. The first holding member 22a surrounds the electrode group 23 and the lid members 24 except the through hole 25 and a portion around the through hole 25. Thus, the electrode group which is a main constituent of a battery is formed into one structural body by the first holding member 22a. The electrode block obtained by integration of the electrode group allows simplification of assembly of a layered cell.

The first holding member 22a maintains the stacked state of the electrode group 23 and lid members 24 in such a manner that the protrusions 221 bite into the positive electrode 23a and the lid members 24. The first holding member 22a includes a first side surface portion 22aa and a first bent portion 22ab. The first side surface portion 22aa covers the side surfaces of the electrode group 23 and lid members 24. The first bent portion ab is bent from an end of the first side surface portion 22aa toward the through hole 25 of the electrode group 23 along the surface of the lid member 24.

The second holding member 22b is disposed on an inner circumferential surface 23e of the through hole 25 in the electrode group. The second holding member 22b maintains the stacked state of the electrode group 23 and lid members 24 in such a manner that the protrusions 221 bite into the negative electrode 23b and the lid members 24. The second holding member 22b includes a second side surface portion 22ba and a second bent portion 22bb. The second side surface portion 22ba covers the inner circumferential surface. The second bent portion 22bb is bent from an end of the second side surface portion 22ba in a direction of the outer diameter of the electrode group 23 along the surface of the lid member 24.

The first holding member 22a and the positive electrode 23a are electrically connected to each other in such a manner that the first side surface portion 22aa bites into an outer circumferential end of the positive electrode 23a. Moreover, the second holding member 22b and the negative electrode 23b are electrically connected to each other in such a manner that the second side surface portion 22ba bites into an inner circumferential end of the negative electrode 23b. On the other hand, the first holding member 22a and the second holding member 22b are insulated from each other because the first bent portion 22ab and the second bent portion 22bb are not in contact with each other and the lid member 24 has an insulating property.

As described above, the protrusions 221 formed on the first holding member 22a and second holding member 22b improve a bonding property between the positive electrodes and a bonding property between the negative electrodes. Moreover, even when the volume of the electrode changes by charge and discharge of a battery, the protrusion biting into the electrode can prevent a contact failure between the electrode and the holding member serving as a current collector terminal. This configuration improves a cycle life characteristic.

Each of the positive electrode and the negative electrode is enclosed with the bag-shaped separator in the foregoing description, but may not be enclosed with the bag-shaped separator. Herein, the outer edge of the negative electrode is covered with the separator, and the circumferential edge of the hole in the positive electrode is covered with the separator. Moreover, the outer edge of the separator is covered with the positive electrode, and the circumferential edge of the hole in the separator is covered with the negative electrode. Thus, the separator certainly separates the positive electrode and the negative electrode from each other at the outer edge of the negative electrode and the circumferential edges of the hole in the positive electrode. Even when the electrodes are deformed, the electrodes do not come into contact with each other at the outer edge and the circumferential edge of the hole. Moreover, the separator is not interposed between the negative electrode and the current collector, and is not interposed between the positive electrode and an outer jacket. Therefore, this configuration prevents a contact failure due to the interposed separator.

2-2. Second Embodiment

Figure 4:
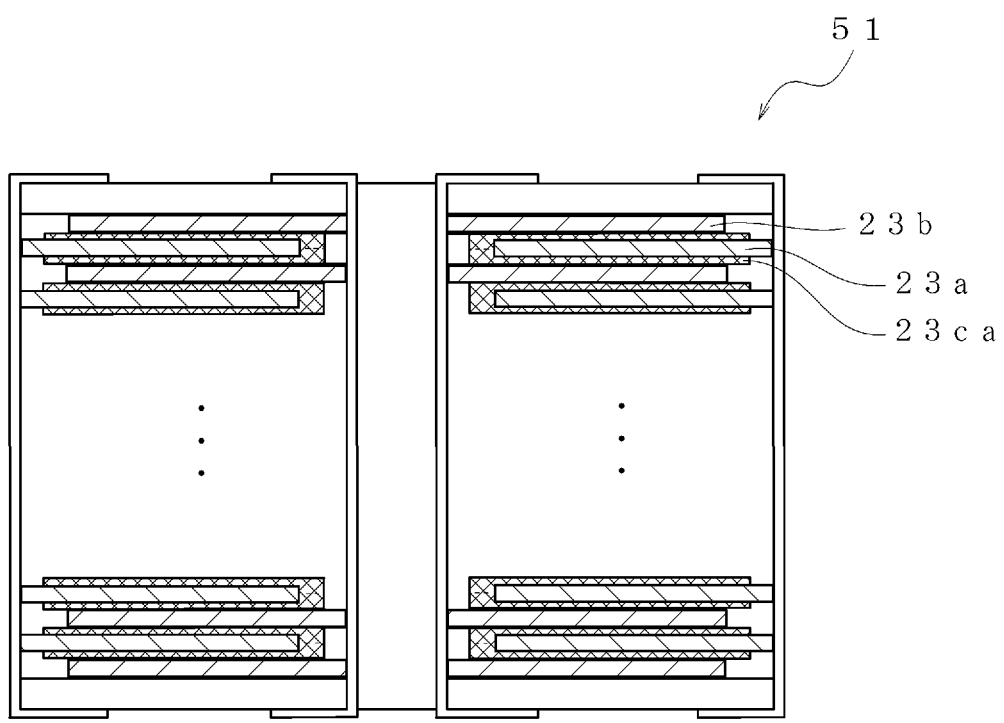
FIG. 4 is an axial sectional view of an electrode block according to a second embodiment.

In the following embodiments, description equal to that in the first embodiment is not given unless otherwise specified. One of a positive electrode and a negative electrode may be enclosed with a bag-shaped separator. FIG. 4 illustrates an electrode block 51 according to a second embodiment. In the electrode block 51, a positive electrode 23a is enclosed with a bag-shaped separator 23ca, but a negative electrode 23b is not enclosed with a bag-shaped separator. This configuration allows a saving in time and effort for enclosing the negative electrode with a bag-shaped separator, which leads to a cost reduction. As illustrated in FIG. 4, an electrode group 23 has an uppermost end corresponding to a negative electrode 23b and a lowermost end corresponding to a negative electrode 23b. Therefore, the number of negative electrodes 23b is larger than that of positive electrodes 23a. A battery configured with the electrode block 51 can be a positive electrode regulation-type battery.

2-3. Third Embodiment

Figure 5:
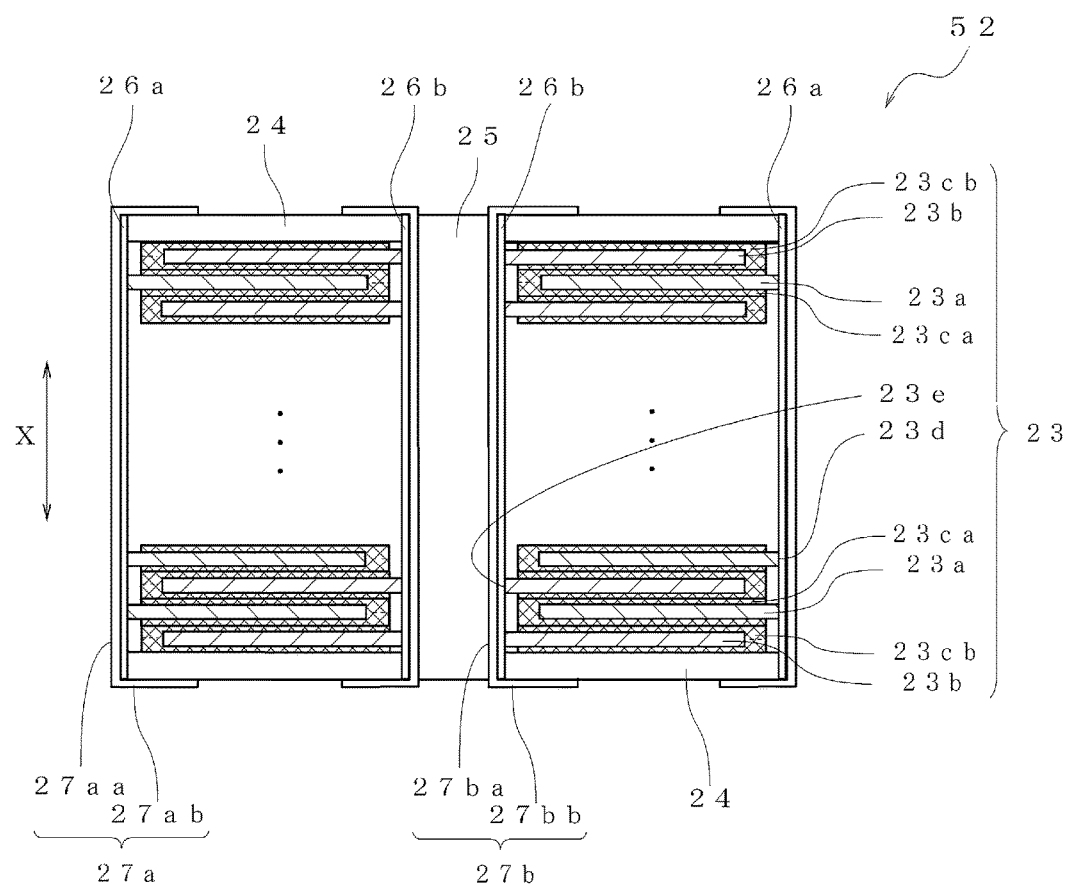
FIG. 5 is an axial sectional view of an electrode block according to a third embodiment.

FIG. 5 is a sectional view schematically illustrating an electrode block 52 according to a third embodiment. The electrode block 52 includes a metal plate 26a interposed between a first holding member 27a and an electrode group 23, and a metal plate 26b interposed between a second holding member 27b and the electrode group 23. In the third embodiment, the metal plates 26 each have a plurality of protrusions formed on at least one side thereof, as illustrated in FIG. 3. The protrusions 221 of the metal plates 26 bite into the electrodes 23a and 23b to ensure a connection between the electrodes. The holding members 27 and the metal plates 26 are entirely in contact with each other, so that the electrodes 23a, 23b and the holding members 27 are electrically connected to each other with certainty. The holding members 27 each serve as an element for strength. An electrode block with larger capacity can be fabricated in such a manner that the element for strength and the element for connecting between the electrodes are separately provided in the holding member.

2-4. Fourth Embodiment

Figure 6A:
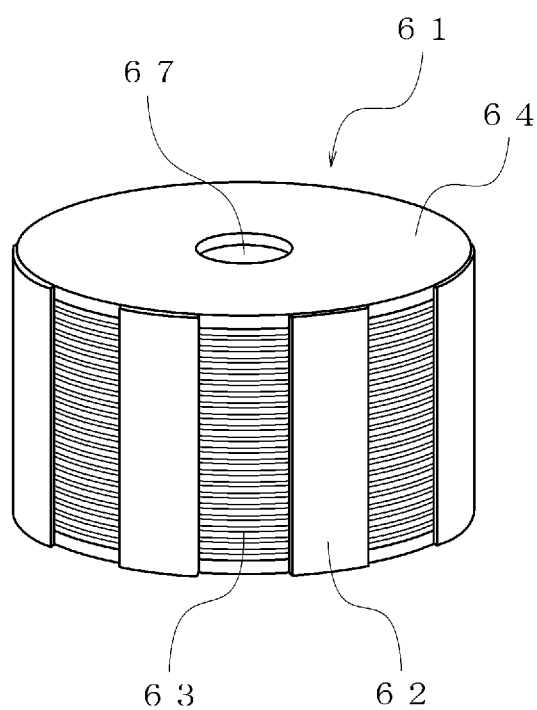
FIG. 6A is a perspective view of a schematic configuration of an electrode block according to a fourth embodiment.
Figure 6B:
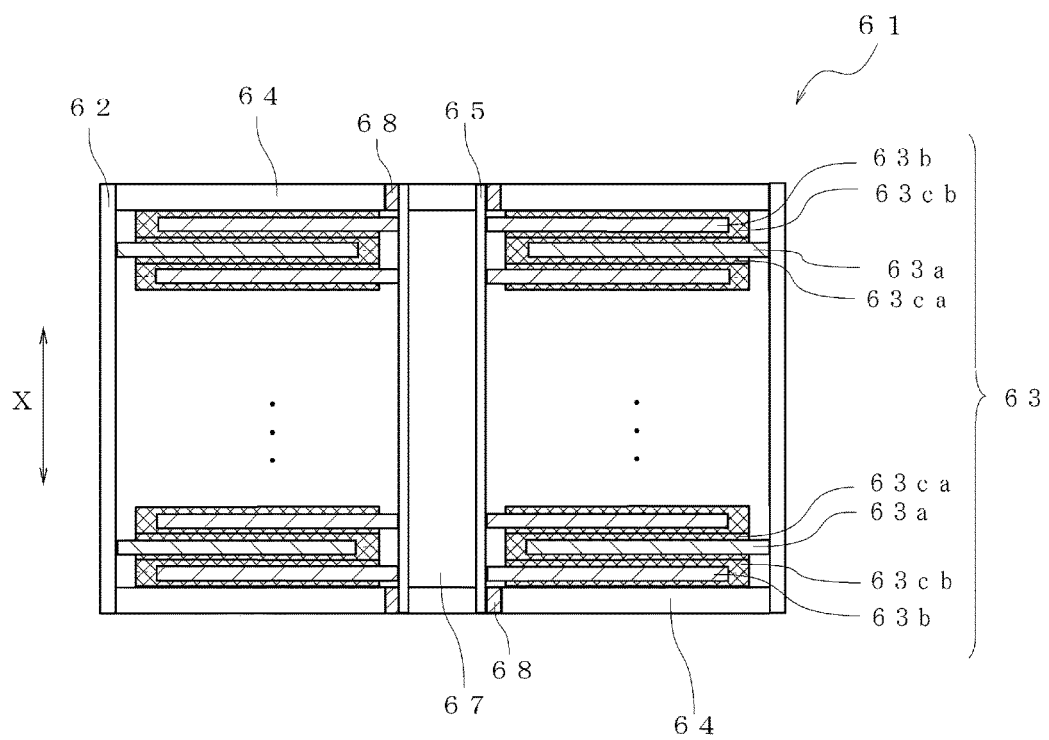
FIG. 6B is an axial sectional view of the electrode block according to the fourth embodiment.

FIG. 6A is a perspective view schematically illustrating an electrode block according to a fourth embodiment. FIG. 6B is a sectional view schematically illustrating the electrode block. The electrode block 61 includes an electrode group 63, lid members 64, and a plurality of first holding members 62. The first holding members 62 maintain the shapes of the electrode group 63 and lid members 64.

A positive electrode 63a is enclosed with a bag-shaped separator 63ca except an outer edge thereof. A negative electrode 63b is enclosed with a bag-shaped separator 63cb except a circumferential edge of a center hole formed therein. The positive electrode 63a enclosed with the bag-shaped separator 63ca and the negative electrode 63b enclosed with the bag-shaped separator 63cb are sequentially stacked such that the respective holes overlap each other. The electrode group 63 is sandwiched between the lid members 64 each having a hole formed at a center thereof. The center hole in the electrode group 63 and the center holes in the lid members 64 communicate with each other to form a through hole 67 of the electrode block 61, as a whole. A second holding member 65 is disposed on an inner circumferential surface of the through hole 67.

The lid member 64 in the fourth embodiment is made of metal. The electrode (the negative electrode 63b in FIG. 6B) which is in contact with the lid member 64 is enclosed with the bag-shaped separator (63cb in FIG. 6B). The electrode enclosed with the bag-shaped separator does not come in direct contact with the lid member 64 and the electrode which is in surface contact therewith. In FIGS. 6A and 6B, the electrode block 61 causes no short circuit between the negative electrode 63b and the positive electrode 63a via the lid member 64.

The first holding member 62 is formed of a short metal strip. The first holding member 62 has one end fixed to a side surface of one of the lid members 64, and the other end fixed to a side surface of the other lid member 64. This fixing method is spot welding for example, but may be brazing. The first holding members maintain the shape of the electrode group 63 as described above to achieve an integral structure as an electrode block.

The center hole in the lid member 64 is larger in diameter than that in the negative electrode 63b. Therefore, when the second holding member 65 is attached to the electrode group 63, the lid member 64 does not come into contact with the second holding member 65. Herein, an insulating ring 68 is preferably attached to the hole in the lid member 64. The insulating ring 68 certainly avoids a contact of the lid member 64 with the second holding member 65 to prevent a short circuit between the electrodes.

The lid member 64 may be formed of an insulative disc. Herein, the lid member 64 and the first holding member 62 are bonded together with an adhesive.

2-4-1. Modification of Fourth Embodiment

Figure 7:
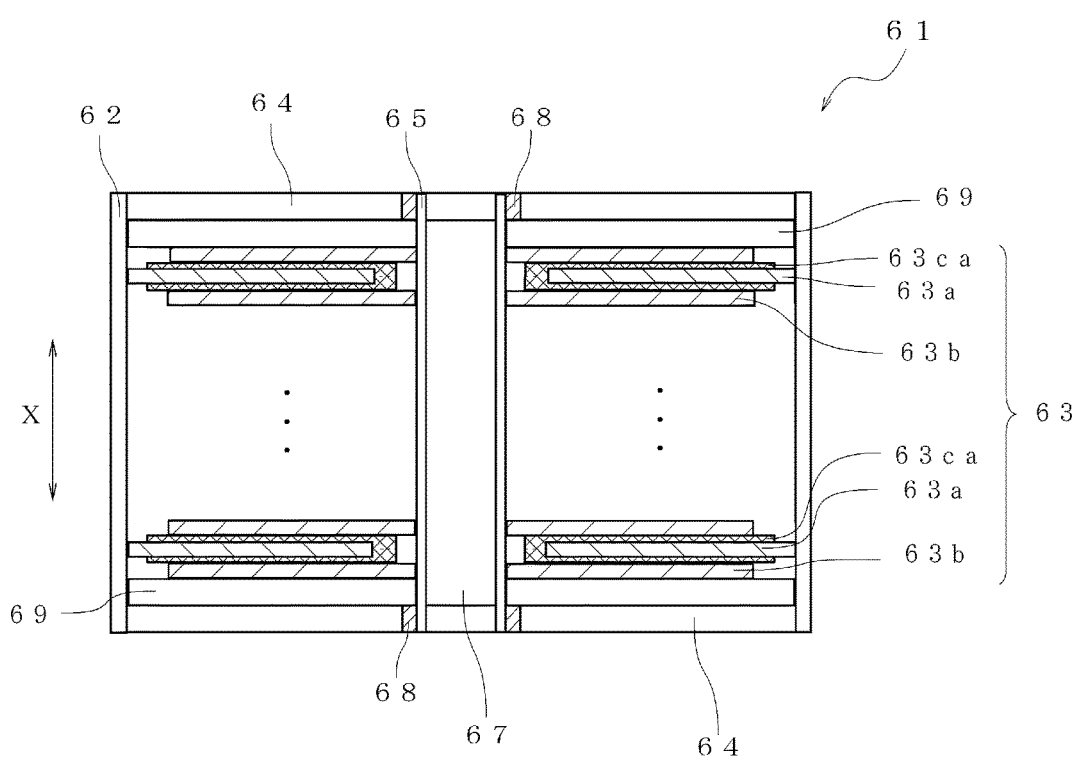
FIG. 7 is an axial sectional view of a modification of the electrode block according to the fourth embodiment.

FIG. 7 is a sectional view schematically illustrating a modification of the electrode block illustrated in FIG. 6B. An insulating plate 69 disposed between the lid member 64 and the electrode group 63 allows the negative electrode 63b which is not enclosed with a bag-shaped separator to serve as an uppermost end or a lowermost end of the electrode group 63. The insulating plate 69 prevents a short circuit between the lid member 64 made of metal and the negative electrode 63b. Moreover, the electrode block may be configured in such a manner that a second holding member 65 is attached as illustrated in FIG. 7.

In the foregoing embodiments, the metal plate illustrated in FIGS. 3A and 3B may be attached to only one of the outer circumferential surface of the electrode group and the inner surface of the through hole. Moreover, the metal plate may have protrusions formed on only a surface thereof which is in contact with the electrode group. Alternatively, the metal plate may have protrusions formed on only a surface thereof opposite to the surface which is in contact with the electrode group, or may have protrusions formed on both the surfaces thereof.

2-5. Assembly Method for Electrode Block (1) A positive electrode is sandwiched between two separators each having an outer diameter smaller than that of the positive electrode and a center hole diameter smaller than that of the positive electrode. A portion where the separators overlap each other is bonded with a heater. A negative electrode is sandwiched between two separators each having an outer diameter larger than that of the negative electrode and a center hole diameter larger than that of the negative electrode. A portion where the separators overlap each other is bonded with the heater.

(2) Two lid members are prepared. A round rod having a diameter slightly smaller than the hole diameter of the negative electrode is placed at a center of a tube having an inner diameter slightly larger than the outer diameter of the positive electrode. One of the lid members is placed such that the round rod passes through a hole formed in the lid member.

(3) The negative electrode enclosed with the bag-shaped separator and the positive electrode enclosed with the bag-shaped separator are sequentially stacked on the lid member such that the round rod passes through the respective holes.

(4) The other lid member is stacked on the uppermost electrode such that the round rod passes through a hole formed in the lid member. Thus, an electrode group sandwiched between the lid members is fabricated.

(5) The lid members, the electrode group, and the round rod are taken out of the tube. A first holding member is attached to outer circumferential surfaces of the lid members and electrode group. Axial two ends of the first holding member are bent by 90 degrees toward the round rod along surfaces of the lid members. Thus, first bent portions are formed. The first bent portions correspond to two ends of a first side surface portion.

(6) The round rod is removed from the lid members and the electrode group. A second holding member is attached to an inner surface of a through hole formed of the holes in the lid members and electrode group. Axial two ends of the second holding member are bent in an outer circumferential direction along the surfaces of the lid members. Thus, second bent portions following a second side surface portion are formed.

(7) The electrode group and the pair of lid members are integrated with the first holding member and the second holding member, so that an electrode block is fabricated. An electrode block having no second holding member may be fabricated if necessary.

3. EMBODIMENT OF LAYERED CELL

[3-1. Structure of Layered Cell]

Figure 8:
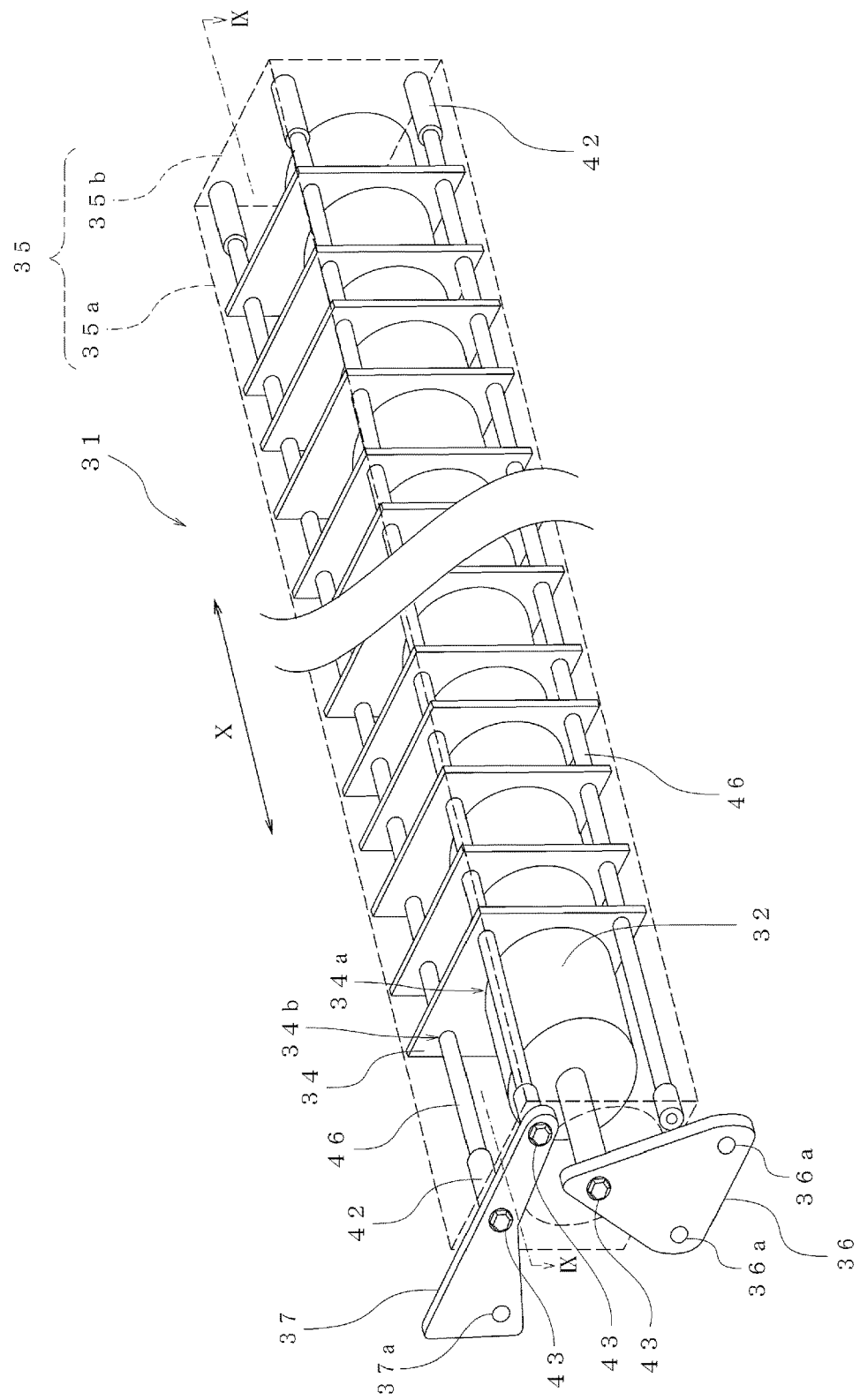
FIG. 8 is a perspective view of a schematic configuration of a layered cell including the electrode block.
Figure 9:
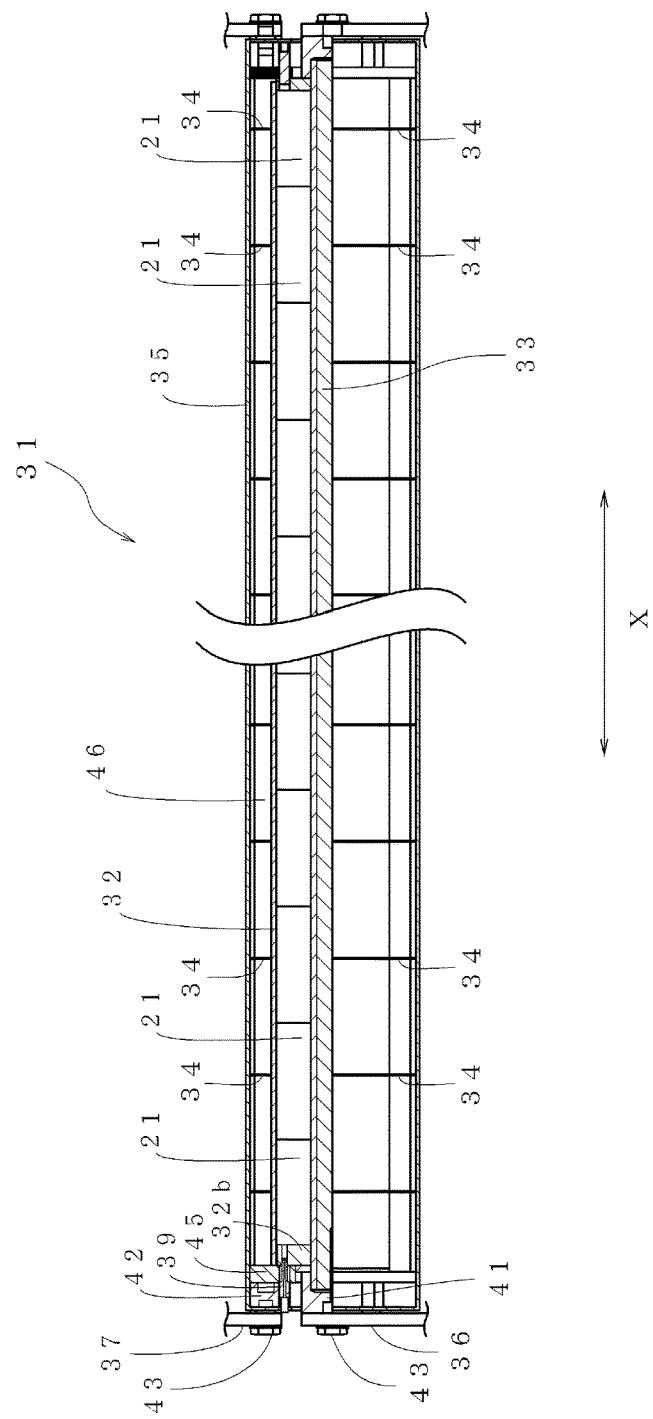
FIG. 9 is a side view of the layered cell, including a section taken along line IX-IX of FIG. 8.
Figure 10:
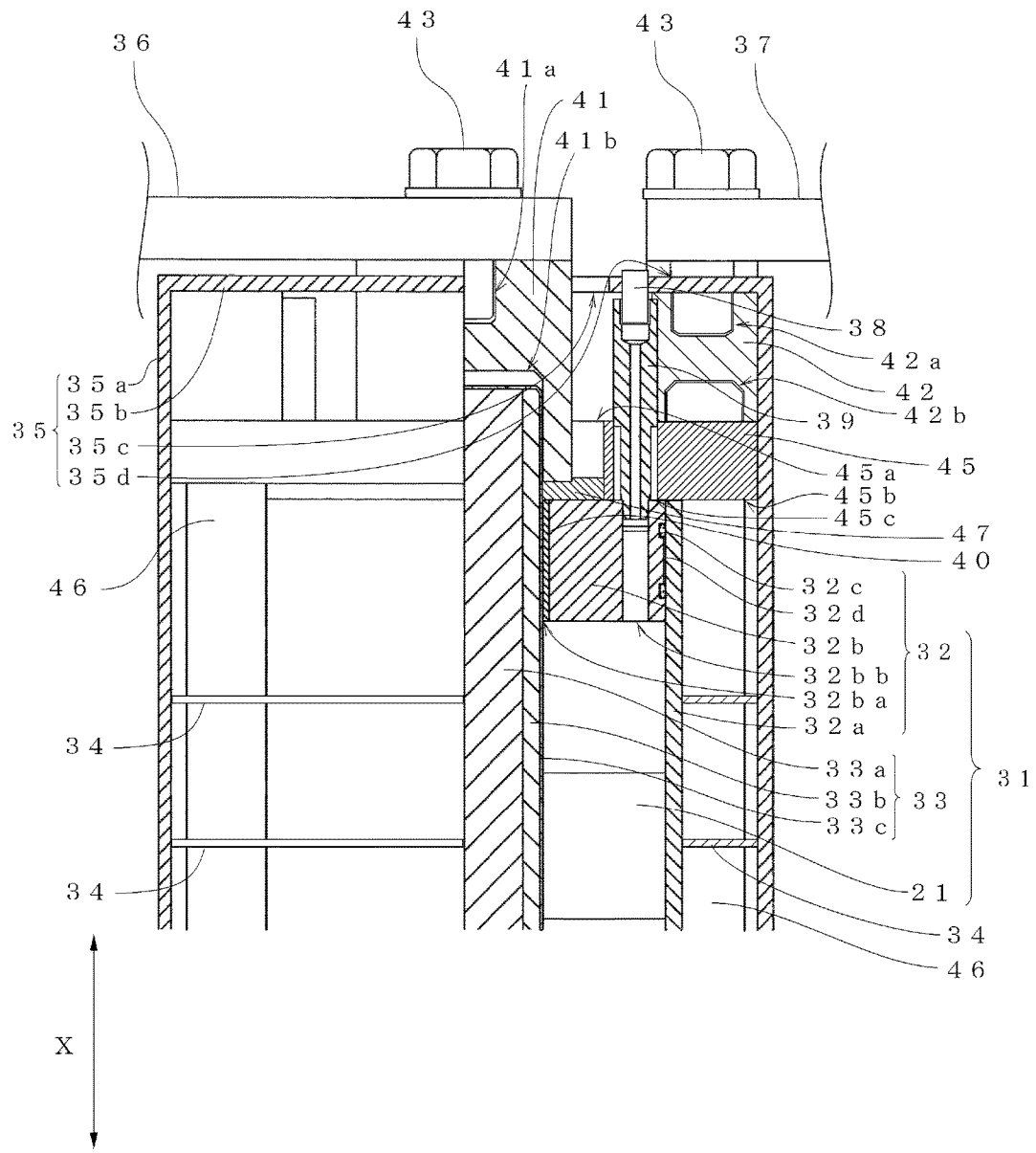
FIG. 10 is an enlarged view of an end of the layered cell illustrated in FIG. 9.

FIG. 8 is a perspective view illustrating a schematic configuration of a layered cell including the electrode block according to the invention. FIG. 9 is a side view including a section taken along line IX-IX in FIG. 8, and illustrates an upper half of the layered cell. FIG. 10 is a sectional view rotated by 90 degrees relative to FIG. 9, and illustrates an end of the layered cell in an enlarged manner. A layered cell 31 mainly includes an outer jacket 32, a current collector 33, a plurality of radiator plates 34, and a casing 35. The outer jacket 32 houses therein the plurality of electrode blocks 21 in a stacked manner. The current collector 33 passes through the plurality of electrode blocks 21 in an axial direction (direction X in FIG. 9) of the outer jacket 32. The radiator plates 34 each have a hole formed at a center thereof, and are disposed around the outer jacket 32 along the direction X such that the respective holes are in contact with an outer periphery of the outer jacket 32. The casing 35 houses therein the outer jacket 32, the current collector 33, the radiator plates 34, and through bolts 46. The casing 35 has axial two ends to which a first bus bar 36 and a second bus bar 37 are attached, respectively. Each of the first bus bar 36 and the second bus bar 37 serves as a connecting member.

Figure 11A:
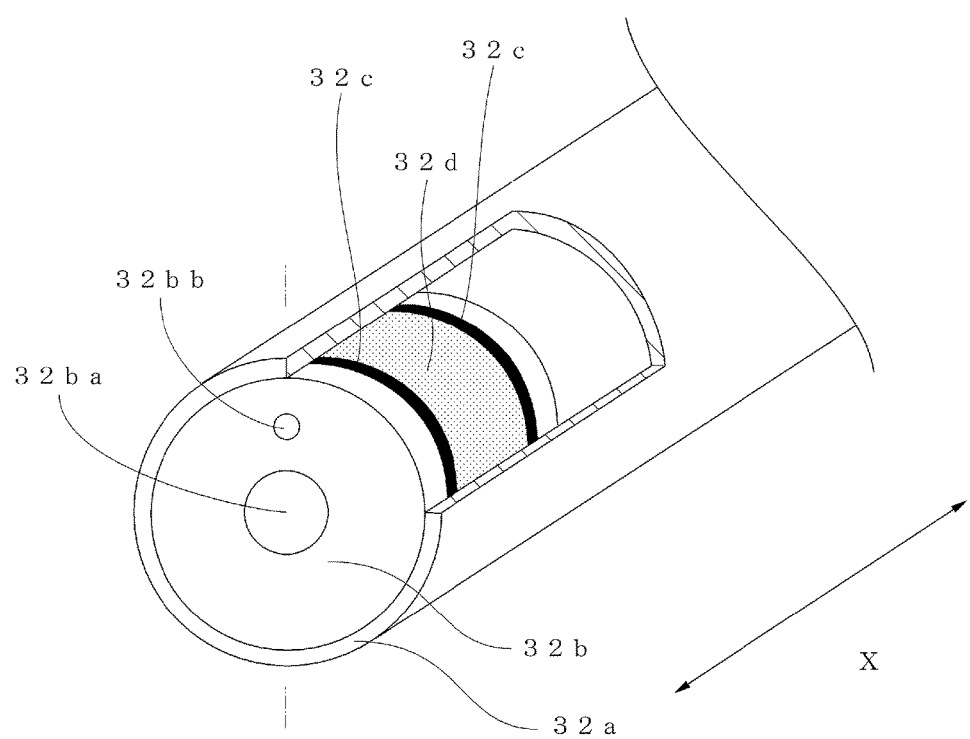
FIG. 11A is a cutaway perspective view of an end of an outer jacket in the layered cell.

The electrode blocks 21 are stacked and housed in a cylindrical pipe 32a. The pipe 32a has an inner diameter slightly smaller than an outer diameter of the electrode block 21. Thus, an outer circumferential surface of the electrode block 21 and an inner circumferential surface of the pipe 32a are kept in contact with each other in a state that the electrode block 21 is inserted into the pipe 32a. The pipe 32a has two open ends each sealed with a columnar sealing cap 32b. The sealing cap 32b has a center hole 32ba through which the current collector 33 passes, and a liquid injection hole 32bb for injection of an electrolyte (see FIG. 11A). An electrolyte injection receptacle 39 is attachable to the liquid injection hole 32bb. An electrolyte is injected into the outer jacket 32 through a hole formed in the electrolyte injection receptacle 39.

Figure 11B:
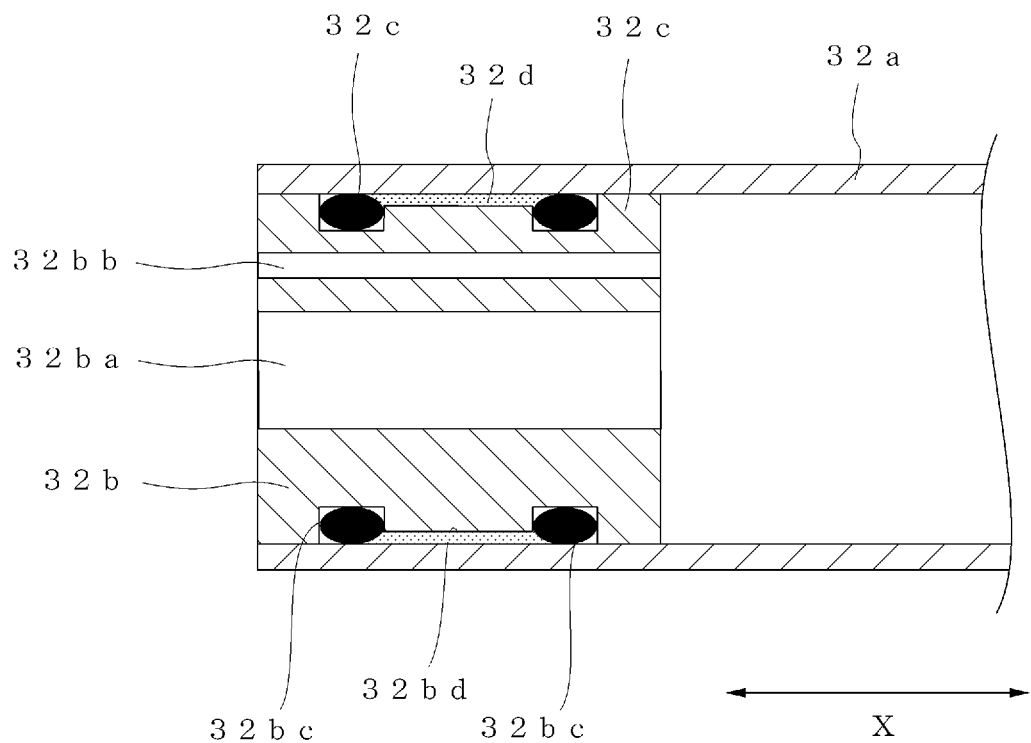
FIG. 11B is a sectional view of the end of the outer jacket in the layered cell.

The sealing cap 32b has two grooves 32bc and a groove 32bd each formed on an outer circumferential surface thereof. Herein, the groove 32bd is shallower than the grooves 32bc and is formed between the grooves 32bc (see FIG. 11B). The sealing cap 32b includes an O-ring 32c disposed in each groove 32bc, and a liquid gasket 32d disposed in the groove 32bd. The O-ring 32c and the liquid gasket 32d prevent the electrolyte from being leaked from the battery. The liquid gasket 32d is preferably made of a material with high viscosity, and may be made of asphalt pitch for example.

Each of the pipe 32a and the sealing cap 32b is made of nickel-plated iron, and possesses electrical conductivity. The outer jacket 32 has an inner circumferential surface which is in contact with the positive electrode 23a via the first holding member 22a. Therefore, the outer jacket 32 and the positive electrode 23a are electrically connected to each other. The outer jacket 32 functions as a current collector terminal for the positive electrode. An insulating sleeve 40 is provided between the sealing cap 32b and the current collector 33 to prevent a short circuit between the outer jacket 32 and the current collector 33 via the sealing cap 32b (see FIG. 10).

The current collector 33 is formed of an electrically conductive round rod. The current collector 33 has an outer circumferential surface which is in contact with the negative electrode 23b via the second holding member 22b. Therefore, the current collector 33 and the negative electrode 23b are electrically connected to each other. The current collector 33 functions as a current collector terminal for the negative electrode.

Figure 12A:
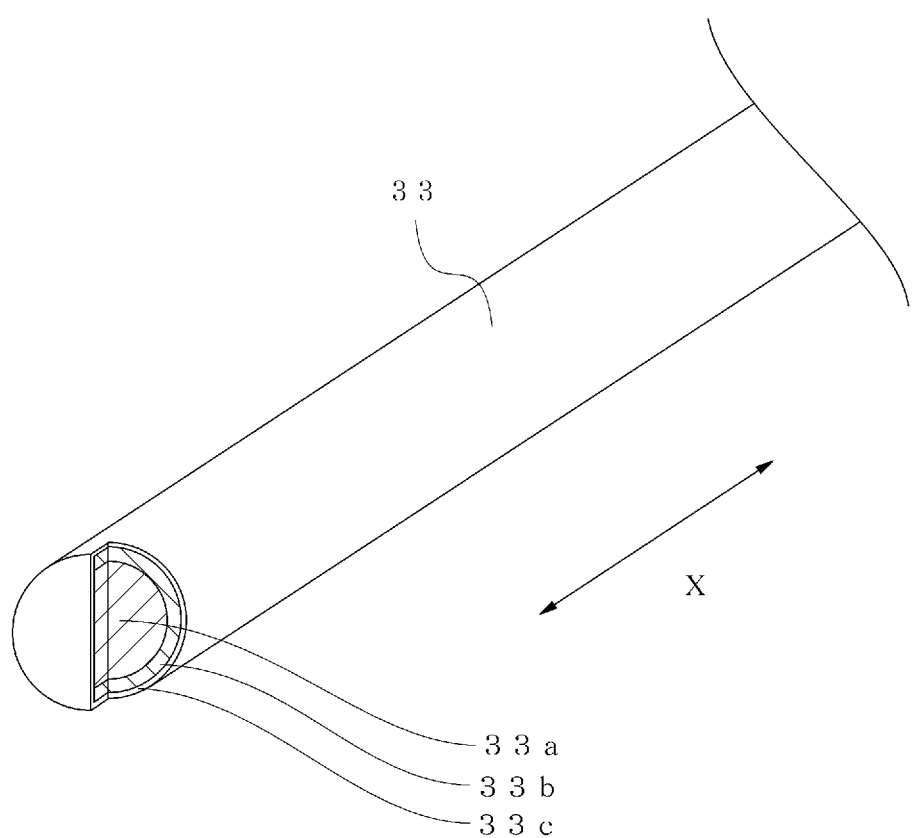
FIG. 12A is a partially cutaway perspective view of a current collector in the layered cell.

As illustrated in, for example, FIG. 12A, the current collector 33 may be configured with a pipe-shaped structural member 33b and a core member 33a housed in the structural member 33b. In this embodiment, the core member 33a is made of copper, and the structural member 33b is made of iron. Copper possesses excellent electrical conductivity, but possesses relatively low alkali-resistance. On the other hand, iron is lower in electrical conductivity than copper, but is less corrosive to alkalis because iron reacts with alkalis to form a passive state film. The current collector 33 may be configured to have a nickel-plated surface 33c. The nickel-plated surface 33b also possesses alkali-resistance. The current collector thus configured is excellent in electrical conductivity and alkali-resistance.

Figure 12B:
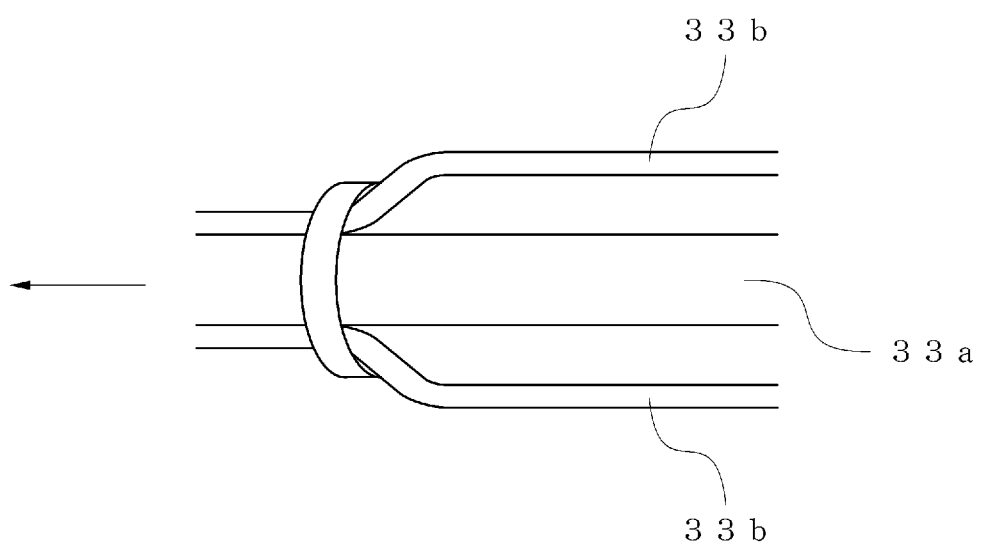
FIG. 12B schematically illustrates a procedure of fabricating the current collector in the layered cell.

The current collector 33 illustrated in FIG. 12A may be fabricated in such a manner that a copper wire is press fitted into an iron pipe. As illustrated in FIG. 12B, alternatively, the current collector 33 may be fabricated as follows. That is, the core member 33a is moved together with the structural member 33b in a direction of an arrow mark such that the structural member 33b is narrowed along the core member 33a. Thus, the structural member 33b is swaged such that the core member 33a is coated with the structural member 33b. Finally, the surface of the structural member 33b is subjected to nickel plating.

With reference to FIG. 10, description will be given of a structure of the end of the layered cell 31. A presser plate 45 is disposed on the outer jacket 32 that houses therein the electrode block 21. A first joining member 41 is disposed on the presser plate 45. The first joining member 41 has a threaded hole 41a formed in one side thereof, and a mounting hole 41b formed in the other side thereof. An end of the current collector 33 is fitted into the mounting hole 41b. A hexagonal-head bolt 43 is screwed into the threaded hole 41a, so that the first bus bar 36 is attached to the first joining member 41. Thus, the current collector 33 and the first bus bar 36 are electrically connected to each other. Herein, the first bus bar 36 functions as a negative electrode terminal.

A second joining member 42 is disposed on an upper end of the through bolt 46. The second joining member 42 has a threaded hole 42a formed in one side thereof, and a mounting hole 42b formed in the other side thereof. The through bolt 46 is fitted into the mounting hole 42b. A hexagonal-head bolt 43 is screwed into the threaded hole 42a, so that the second bus bar 37 is attached to the second joining member 42. Thus, the outer jacket 32 and the second bus bar 37 are electrically connected to each other via the through bolt 46. The second bus bar 37 functions as a positive electrode terminal.

The presser plate 45 is formed of a rectangular metal plate. The presser plate 45 has a hole 45a into which the first joining member 41 is fitted, a hole 45b through which the through bolt 46 passes, and a hole 45c through which the electrolyte injection receptacle 39 passes. The presser plate 45 is in contact with the outer jacket 32, and functions as a current collector terminal for the positive electrode. An insulating ring 47 is disposed between the first joining member 41 and the presser plate 45 to achieve insulation between the presser plate 45 and the current collector 33.

The presser plate 45 serves to distribute the tightening force by the hexagonal-head bolt 43. The hexagonal-head bolt 43 applies compressive force to the electrode block 21 in an axial direction (direction X in FIG. 10). This compressive force is acted to prevent deformation of the electrode block due to charge and discharge, and is also acted to reduce contact resistance between the electrode blocks.

The electrolyte injection receptacle 39 is formed of an elongated column having a hole formed at a center thereof. The electrolyte injection receptacle 39 is a liquid injection port for externally injecting an electrolyte into the outer jacket 32. After the injection of the electrolyte, the outer jacket 32 is hermetically sealed with a plug 38. Herein, a lower end of the layered cell is similar in structure to the upper end of the layered cell.

The radiator plate 34 is formed of a rectangular plate. The radiator plate 34 has a battery hole 34a formed at a center thereof, and bolt holes 34b formed at four corners thereof. Herein, the layered cell 31 passes through the battery hole 34a, and the through bolt 46 passes through the bolt hole 34b (see FIG. 8 for example). The radiator plate 34 possesses electrical conductivity, and is made of nickel-plated aluminum. The battery hole 34a comes into contact with a surface of the outer jacket 32, so that heat is transferred from the outer jacket 32 to the radiator plate 34.

The through bolt 46 possesses electrical conductivity, and is made of nickel-plated iron. The bolt hole 34b comes into contact with the through bolt 46, so that the outer jacket 32, the radiator plate 34, and the through bolt 46 are electrically connected to one another. Herein, the materials for the radiator plate 34 and through bolt 46 are not limited to iron and aluminum. The radiator plate 34 and the through bolt 46 may be made of any metal.

The casing 35 includes a square tube 35a having a section formed into a substantially square frame shape, and lid members 35b disposed on two ends of the square tube 35a and formed into a substantially square plate shape. The casing 35 has an internal dimension substantially equal to an external dimension of the radiator plate 34. Each of the lid members 35b has a hole 35c through which the first joining member 41 passes, and a hole 35d through which the second joining member 42 passes.

[3-2. Structure of Bus Bar and Connection Structure of Layered Cell]

Figure 13A:
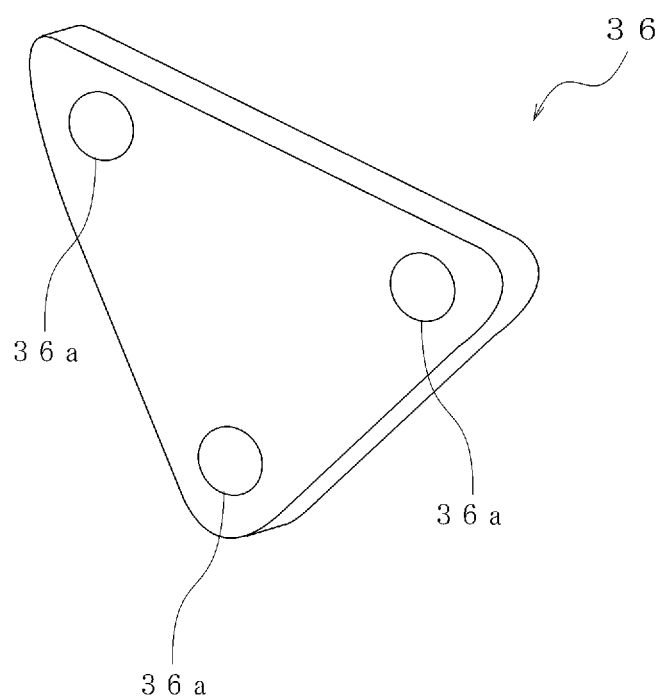
FIG. 13A illustrates a first bus bar in the layered cell.

FIG. 13A is a perspective view illustrating the first bus bar 36 in this embodiment. The first bus bar 36 is formed of a substantially triangular metal plate, and has three first bolt holes 36a through which hexagonal-head bolts 43 pass, respectively. The first bus bar 36 is attached to the ends of the adjacent layered cells 31 to electrically connect between the layered cells 31. For example, the two layered cells 31 are electrically connected to each other as follows. That is, the first joining member 41 of one of the layered cells 31 and one of the first bolt holes 36a in the first bus bar 36 are joined together using the hexagonal-head bolt 43. Moreover, the second joining member 42 of the other layered cell 31 and the remaining two first bolt holes 36a in the first bus bar 36 are joined together using the hexagonal-head bolts 43.

Figure 13B:
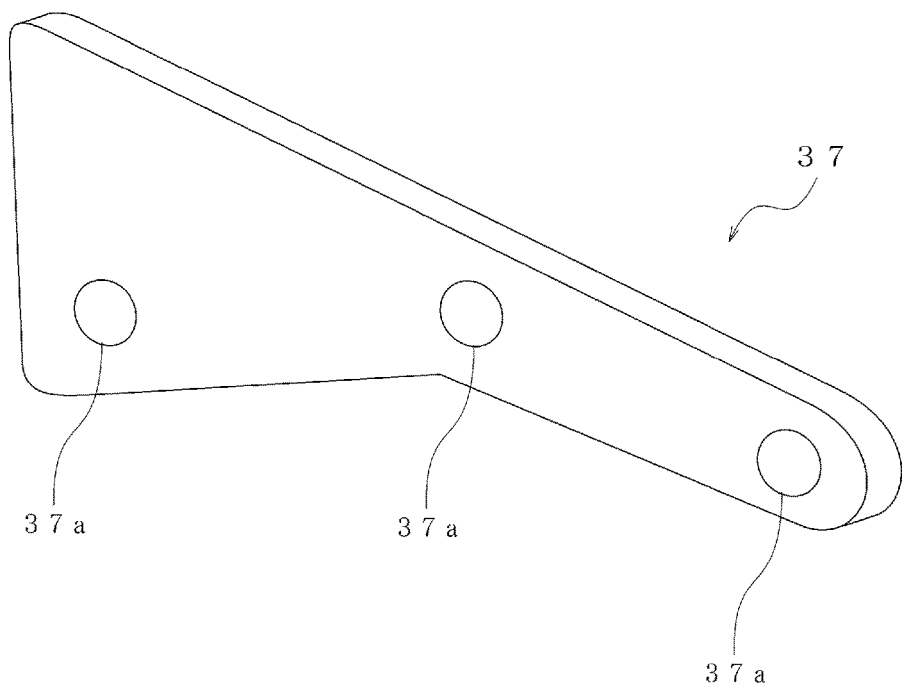
FIG. 13B illustrates a second bus bar in the layered cell.

FIG. 13B is a perspective view illustrating the second bus bar 37. The second bus bar 37 is formed of an elongated metal plate, and has three second bolt holes 37a. The second bus bar 37 is attached to the ends of the adjacent layered cells 31 to electrically connect between the layered cells 31. For example, the two layered cells 31 are electrically connected to each other as follows. That is, the first joining member 41 of one of the layered cells 31 and one of the second bolt holes 37a in the second bus bar 37 are joined together using a hexagonal-head bolt 43. Moreover, the second joining member 42 of the other layered cell 31 and the remaining two second bolt holes 37a in the second bus bar are joined together using hexagonal-head bolts 43.

The shapes of the first bus bar 36 and second bus bar 37 are not particularly limited to those in this embodiment. Herein, each of the first bus bar 36 and the second bus bar 37 is made of nickel-plated iron.

Figure 14:
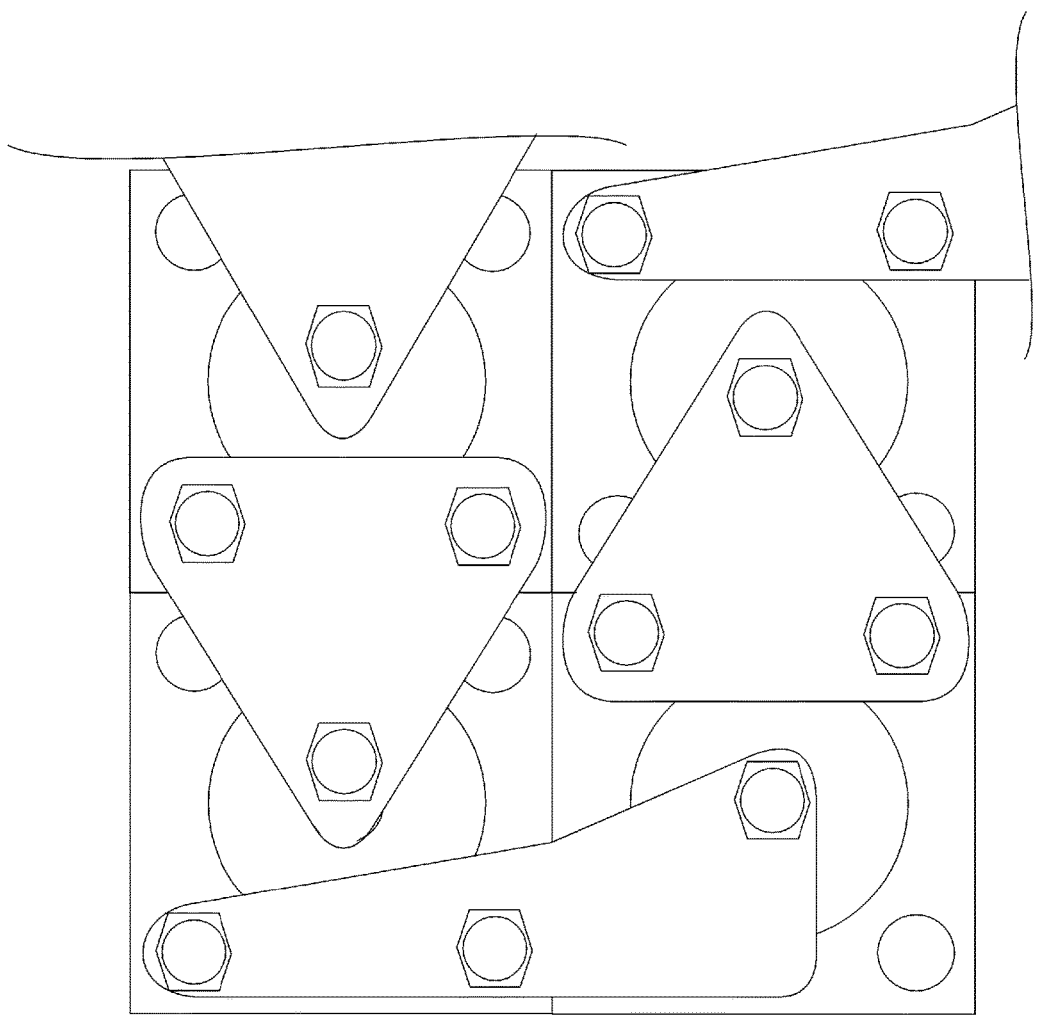
FIG. 14 schematically illustrates the plurality of layered cells connected to one another.

FIG. 14 illustrates the plurality of layered cells 31 connected in series by the first bus bar 36 and the second bus bar 37. The first bus bar 36 is shaped to facilitate the connection between the layered cells 31 in the vertical direction of FIG. 14. On the other hand, the second bus bar 37 is shaped to facilitate the connection between the layered cells 31 in the horizontal direction of FIG. 14. Appropriately selecting the bus bars can ensure the degree of freedom in arrangement at the time when the plurality of layered cells 31 is assembled into a battery pack. For example, the layered cells can be connected in parallel as follows. That is, in the adjacent layered cells, the current collectors 33 are connected to each other and the through bolts 46 are connected to each other by the second bus bar 37.

[3-3. Assembly Method for Layered Cell]

Next, description will be given of a method of assembling the layered cell 31 using the electrode blocks 21.

(1) The plurality of electrode blocks 21 is fabricated by the method described in [2-5. Assembly Method for Electrode Block]. Moreover, the pipe 32a of the outer jacket 32 is fixedly placed on a workbench.

(2) The sealing cap 32b is attached to one of the open ends of the pipe 32a. The plurality of electrode blocks 21 is press fitted into the outer jacket 32 through the other open end of the pipe 32a.

(3) The current collector 33 is press fitted into the through hole 25 at the center of the electrode blocks 21. The sealing cap 32b is attached to the other open end of the pipe 32a. The outer jacket is deaerated, and then is hermetically sealed in a state that an electrolyte is injected thereinto.

(4) The plurality of radiator plates 34 is attached to the outer jacket 32, and then is secured to the outer jacket 32 with the second joining member 42 and the four through bolts 46 each passing through the radiator plates 34. The side surfaces, top surface, and bottom surface of the outer jacket provided with the radiator plates are covered with the square tube 35a. The presser plates 45 are press fitted into the square tube 35a through the two ends of the square tube 35a. The first joining member 41, the second joining member 42, the electrolyte injection receptacle 39, and the like are attached to the presser plates 45. The lid members 35b are attached to the two ends of the square tube 35a, and then the bus bars 36 and 37 are attached to the lid members 35b.

4. FUNCTIONS AND EFFECTS

Description will be given of functions and effects of the electrode block according to the first embodiment and the layered cell including the electrode block.

[4-1. Effects of Electrode Block]

In the electrode block 21 according to the first embodiment, the first holding member 22a and the second holding member 22b maintain the shape of the electrode group 23. Therefore, the positive electrode 23a, the negative electrode 23b, and the separator 23c are integrated into one. Accordingly, the electrode group 23 can be handled as one block, which leads to an improvement in workability upon fabrication.

The layered cell 31 according to the embodiment includes the plurality of stacked electrode blocks 21. This configuration can easily increase the capacity of the battery.

[4-2. Effects of Metal Plate]

Each of the first holding member 22a and the second holding member 22b has the plurality of protrusions 221 formed on the surface coming into contact with the electrode group 23. The protrusions 221 bite into the electrodes to further improve the bonding between the positive electrode and the outer jacket or the bonding between the negative electrode and the current collector. Even when the volume of the electrode changes by the charge and discharge of the battery, the protrusion biting into the electrode can prevent a contact failure between the electrode and the terminal. This configuration improves a cycle life characteristic.

[4-3. Effects of Bag-Shaped Separator]

The positive electrode 23a is enclosed with the bag-shaped separator 23ca, and the negative electrode 23b is enclosed with the bag-shaped separator 23cb. Therefore, the bag-shaped separators capture therein dust or foreign matters derived from the electrodes in the course of transporting the battery and in the course of assembling the battery. The bag-shaped separators prevent the entry of dust or foreign matters derived from the electrodes into between the electrodes and between the electrode and the current collector terminal, which leads to prevention of an internal short circuit. The bag-shaped separators also prevent a contact failure caused by the separators displaced and consequently interposed between the positive electrode 23a and the outer jacket 32 and between the negative electrode 23b and the current collector 33.

[4-4. Effects of Lamination]

The layered cell 31 according to the embodiment includes the plurality of stacked electrode blocks 21. In the adjacent electrode blocks 21, specifically, the first holding members 22a are connected to each other in a direct manner and are connected to each other via the outer jacket 32. Moreover, the second holding members 22b are connected to each other in a direct manner and are connected to each other via the current collector 33. Thus, the electrode blocks 21 are electrically connected in parallel. In the layered cell 31 according to the embodiment, the electrode blocks 21 are stacked in the outer jacket 32, so that positive terminals are electrically connected to each other and negative terminals are electrically connected to each other in the adjacent electrode blocks 21. Accordingly, the layered cell 31 establishes a structurally simple serial connection of the plurality of electrode blocks 21, and also establishes an electrically simple parallel connection of the plurality of electrode blocks 21. This configuration can easily increase the capacity of the layered cell.

[4-5. Effects of Cooling Performance]

The following effects are attained with regard to cooling performance. The positive electrode 23a is firmly pressed against the inner circumferential surface of the outer jacket 32 via the first holding member 22a, so that the positive electrode 23a and the outer jacket 32 are in close contact with each other. Accordingly, heat generated from the positive electrode 23a is transferred to the outer jacket 32 via the first holding member 22a. On the other hand, heat generated from the negative electrode 23b is transferred to the positive electrode 23a via the separator 23c. The separator 23c is formed of one thin sheet, and therefore does not hinder the heat transfer so much. As described above, each of the heat generated from the positive electrode 23a and the heat generated from the negative electrode 23b is transferred to the outer jacket 32 with low thermal resistance, which restrains a temperature rise inside the layered cell 31.

In a spiral-wound type battery, a separator which can hardly transfer heat is interposed in a multilayered manner between a center of the battery and a battery case. Therefore, even when the battery case is cooled, the temperature inside the battery is not lowered so much. With regard to a 18650-type battery to be used herein as an example, an overall heat transfer coefficient of a layered cell is compared with that of a spiral-wound battery. As the result, it was revealed that the overall heat transfer coefficient of the layered cell according to the embodiment of the invention is about 100,000 times larger than that of the conventional spiral-wound battery.

With regard to the layered cell according to the invention, the temperature inside the battery can be restrained to almost the temperature at the surface of the battery. Heat transfer at the surface of the battery controls heat transfer inside the battery. To lower the temperature inside the battery, the temperature at the surface of the battery should be lowered. For this reason, the cooling performance is further improved by increasing a radiation surface area by attaching the plurality of radiator plates 34 to the periphery of the outer jacket 32. When the casing of the layered cell is cooled by air using a cooling fan, the temperature inside the battery is restrained to 51° C. On the other hand, when the casing of the layered cell is naturally cooled by air using the radiator plates, the temperature inside the battery can be restrained to 23° C. These results were confirmed by experiment.

Figure 15:
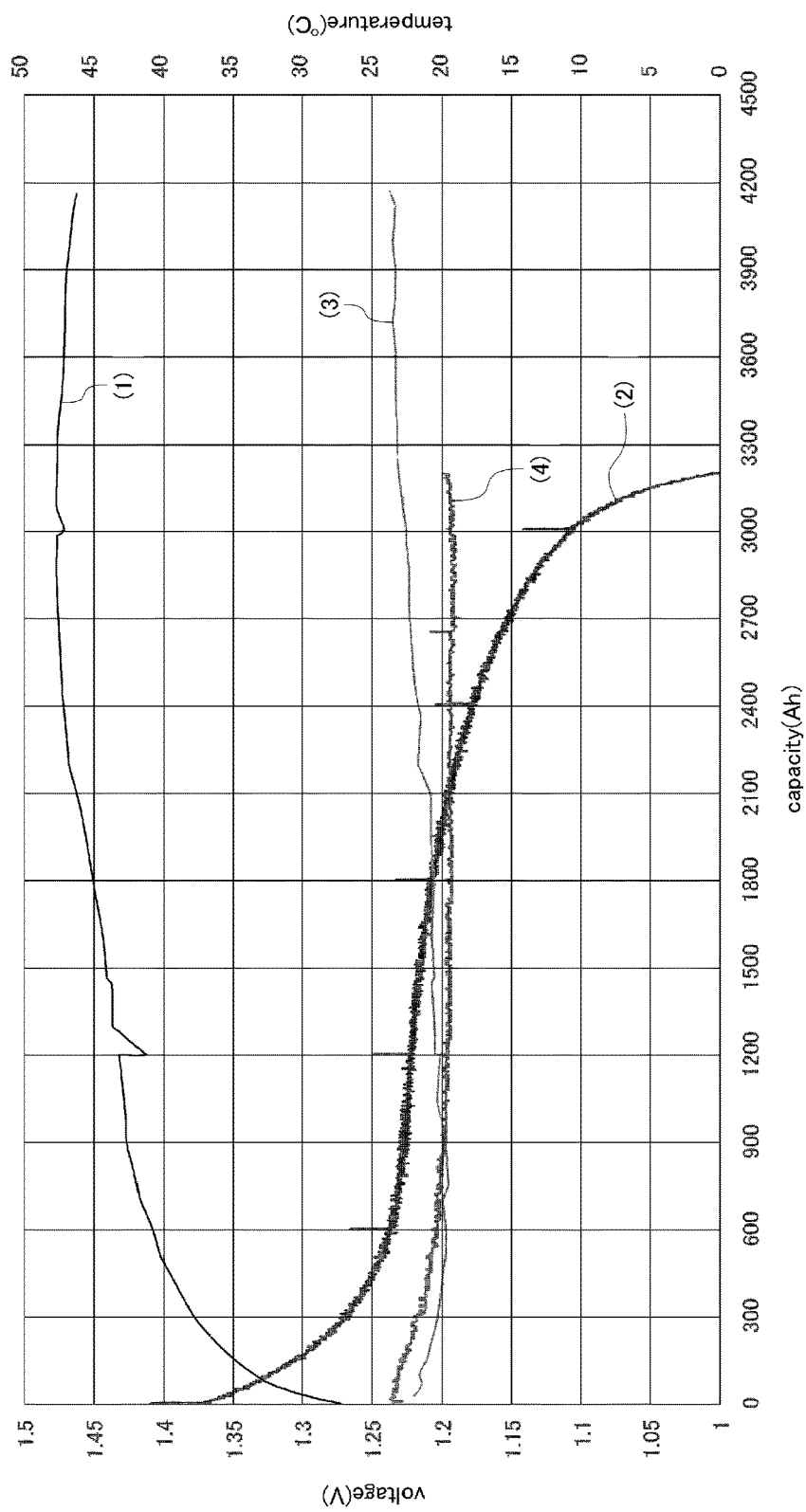
FIG. 15 is a graph of results of a temperature rise test conducted on the layered cell.

FIG. 15 shows results of a temperature rise test conducted on the layered cell 31 according to the embodiment. In FIG. 15, a curve (1) indicates a charge voltage, and a curve (2) indicates a discharge voltage. Moreover, a curve (3) indicates a temperature inside the battery at charging, and a curve (4) indicates a temperature inside the battery at discharging. As shown in FIG. 15, the temperature inside the layered cell 31 according to the embodiment does not change so much even when the layered cell 31 is charged and discharged. Thus, the temperature rise inside the battery can be restrained. Herein, the temperature inside the battery is low at the initial stage of charge or discharge because room temperature drops. As described above, the layered cell 31 according to the embodiment requires no pipe for circulating a coolant, unlike a conventional spiral-wound battery. Therefore, the layered cell 31 according to the embodiment can restrain the temperature rise thereinside with a compact structure.

5. OTHER EMBODIMENTS

The preferred embodiments of the invention have been described above with reference to the drawings; however, various additions, changes or deletions can be made within the scope which does not depart from the gist of the invention.

In the foregoing description, the layered cell according to the embodiment includes the outer jacket serving as the positive electrode current collector, and the current collector serving as the negative electrode current collector. Alternatively, the outer jacket may serve as the negative electrode current collector, and the current collector may serve as the positive electrode current collector. In the foregoing description, moreover, the electrode group according to the embodiment has the circular through hole at the center thereof, and is formed into the cylindrical shape as a whole; however, the invention is not limited thereto. For example, the electrical group may be formed into a square tube shape, and the through hole may be formed into a square shape. In the foregoing description, further, the layered cell according to the embodiment is formed into the columnar shape, but may be formed into a prism shape.

The various constituents described in the embodiment may be made of any other materials in addition to those described above. For example, the constituent made of a metal may be made of a metal which is not subjected to nickel plating, in addition to nickel-plated iron. In the embodiment, a nickel-metal hydride battery is mainly described as an example. The invention is also applicable to any other secondary batteries such as a lithium-ion battery and a manganese battery.

INDUSTRIAL APPLICABILITY

The layered cell according to the invention can be suitably used as a consumer power storage apparatus in addition to an industrial power storage apparatus.

REFERENCE SIGN LIST

21 Electrode block
22 Holding member (a: side surface portion/b: bent portion)
23 Electrode group (a: positive electrode/b: negative electrode/c: separator)
24 Lid member
25 Through hole
26 Metal plate
27 Holding member
31 Layered cell
32 Outer jacket (a: pipe/b: sealing cap)
33 Current collector (a: core member/b: structural member/c: nickel-plated surface)
34 Radiator plate (a: battery hole/b: bolt hole)
35 Casing (a: square tube/b: lid member)
36 First bus bar
37 Second bus bar
38 Plug
39 Electrolyte injection receptacle
40 Insulating sleeve
41 First joining member
42 Second joining member
43 Hexagonal-head bolt
45 Presser plate
46 Through bolt
47 Insulating ring
51 Electrode block
52 Electrode block
61 Electrode block
62 First holding member
63 Electrode group (a: positive electrode/b: negative electrode/c: separator)
64 Lid member
65 Second holding member
67 Through hole
68 Insulating ring
69 Insulating plate
220 Metal plate
221 Protrusion
222 Opening
223 Folded portion

The invention claimed is:

1. An electrode block comprising:
    an electrode group having a stacked structure with a positive electrode, a negative electrode, and a separator interposed between the positive electrode and the negative electrode;
    lid members made of an insulating material plate disposed on two ends of the electrode group in the stacked direction; and
    a first holding member made of a conductive material attached to outer surfaces of the electrode group and lid members,
    each of the positive electrode, the negative electrode, the separator and lid members having a hole forming a through hole configured to accept a collector therethrough,
    wherein the first holding member is electrically connected to a first electrode which is one of the positive electrode and the negative electrode, and is not electrically connected to a second electrode which is the other one of the positive electrode and the negative electrode,
    wherein the electrode block is constituted such that liquid flows into and flows out of the electrode block.

2. The electrode block according to claim 1, wherein
    each of the first electrode, the second electrode, and the separator has a hole formed at a center thereof,
    an outer edge of the second electrode is covered with the separator,
    a circumferential edge of the hole in the first electrode is covered with the separator,
    an outer edge of the separator is covered with the first electrode, and
    a circumferential edge of the hole in the separator is covered with the second electrode.

3. The electrode block according to claim 1, wherein the first holding member has a plurality of protrusions formed on at least one side thereof.

4. The electrode block according to claim 1, further comprising:
a metal plate interposed between the first holding member and the first electrode,
the metal plate having a plurality of protrusions formed on at least one side thereof.

5. The electrode block according to claim 1, wherein the first electrode is enclosed with a first separator having a bag shape in a state that an outer edge of the first electrode is exposed from the first separator.

6. The electrode block according to claim 1, wherein the second electrode is enclosed with a second separator having a bag shape in a state that an inner edge of the hole in the second electrode is exposed from the second separator.

7. The electrode block according to claim 1, wherein the first holding member has:
a side surface portion coming into contact with a side surface of the electrode block; and
bent portions bent from the side surface portion toward centers of the lid members.

8. The electrode block according to claim 1, wherein the first holding member is fixed to outer side surfaces of the lid members.

9. The electrode block according to claim 1, wherein each of the lid members has a hole formed at a center thereof, and
the holes in the positive electrode, negative electrode, separator, and lid members form a through hole in a stacked state of the electrode group and lid members,
the electrode block further comprising:
a second holding member attached to an inner surface of the through hole,
wherein
the second holding member is electrically connected to the second electrode, and is not electrically connected to the first electrode.

10. The electrode block according to claim 9, wherein the second holding member has a plurality of protrusions formed on at least one side thereof.

11. The electrode block according to claim 9, further comprising:
a metal plate interposed between the second holding member and the second electrode,
the metal plate having a plurality of protrusions formed on at least one side thereof.

12. A layered cell comprising:
the electrode block according to claim 1;
a tubular outer jacket for housing the electrode block; and
a current collector passing through the through hole in the electrode block, wherein
the first electrode is electrically connected to the outer jacket, and
the second electrode is electrically connected to the current collector.

13. The layered cell according to claim 12, wherein the current collector includes:
an electrically conductive core rod; and
a structural member for covering an outer periphery of the core rod.

14. The layered cell according to claim 12, further comprising:
a sealing cap for closing an open end of the outer jacket, wherein the sealing cap has two annular grooves formed on an outer periphery thereof,
and
the sealing cap includes an O-ring attached to each annular groove, and a sealing member provided between the annular grooves.

15. The layered cell according to claim 12, further comprising:
a plurality of radiator plates attached to an outer circumferential surface of the outer jacket along an axial direction of the outer jacket.

16. The layered cell according to claim 15, further comprising: a through bolt passing through the radiator plates.

17. A battery pack comprising:
the plurality of layered cells according to claim 16;
a first connecting member for connecting between the through bolts of the adjacent layered cells; and
a second connecting member for connecting between the current collectors of the adjacent layered cells,
wherein
the first connecting member and the second connecting member electrically connect among the layered cells.

18. A battery pack comprising:
the plurality of layered cells according to claim 16; and
a third connecting member for connecting between the through bolt of one of the adjacent layered cells and the current collector of the other layered cell, wherein
the third connecting member electrically connects among the layered cells.

19. An assembly method for the layered cell according to claim 12,
the assembly method comprising:
a step A of sandwiching the positive electrode between two the separators each having an outer diameter smaller than an outer diameter of the positive electrode and a center hole diameter smaller than a hole diameter of the positive electrode, bonding with a heater a portion where the separators overlap each other, sandwiching the negative electrode between the separators each having an outer diameter larger than an outer diameter of the negative electrode and a center hole diameter larger than a hole diameter of the negative electrode, and bonding with the heater a portion where the separators overlap each other, thereby preparing the positive electrode enclosed with the bag-shaped separator and the negative electrode enclosed with the bag-shaped separator;
a step B of sequentially stacking the negative electrode enclosed with the bag-shaped separator and the positive electrode enclosed with the bag-shaped separator such that a round rod having a diameter smaller than the hole diameter of the negative electrode passes through the hole in the negative electrode and the hole in the positive electrode, thereby assembling the electrode group;
a step C of inserting the round rod into the holes in the lid members from two ends of the round rod to sandwich the electrode group between the lid members;
a step D of mounting the first holding member on an outer side surface of the electrode group, and bending the first holding member toward the round rod along a surface of the lid member, thereby attaching the first holding member to the electrode group and the lid members;

a step E of pulling out the round rod;

a step F of attaching the second holding member to the inner surface of the through hole in the center of the electrode group and lid members;

a step G of repeatedly carrying out the steps A to F to assemble the plurality of electrode blocks;

a step H of attaching a first sealing cap to one of two open ends of the tubular outer jacket;

a step I of press fitting the plurality of electrode blocks into the outer jacket through the other;

a step J of press fitting the current collector into the insides of the second holding members of the electrode blocks;

a step K of deaerating the outer jacket;

a step L of attaching a second sealing cap to the other open end of the outer jacket to seal the battery; and a step M of injecting an electrolyte into the outer jacket.

* * * * *